United States Patent
Sakamoto et al.

(10) Patent No.: US 6,879,241 B2
(45) Date of Patent: Apr. 12, 2005

(54) VEHICLE READY FOR CARD KEY AND RADIO COMMUNICATION SYSTEM WHICH UTILIZES CARD KEY

(75) Inventors: Tomokazu Sakamoto, Saitama (JP); Kenji Tamaki, Saitama (JP); Yoshiyuki Horii, Saitama (JP); Satoshi Kazama, Saitama (JP); Hidetoshi Kabayama, Saitama (JP); Dai Higashida, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 387 days.

(21) Appl. No.: 10/228,967

(22) Filed: Aug. 28, 2002

(65) Prior Publication Data

US 2003/0062986 A1 Apr. 3, 2003

(30) Foreign Application Priority Data

Sep. 28, 2001 (JP) ........................................ 2001-304452

(51) Int. Cl.⁷ .............................................. G08B 21/00

(52) U.S. Cl. ................. 340/5.31; 340/5.28; 340/426.12; 340/426.11; 340/426.13; 340/5.61; 701/2; 701/36

(58) Field of Search ............................... 340/5.28, 5.31, 340/426.11, 426.12, 429, 539.1, 426.14, 5.33, 5.32, 5.61, 5.62, 5.63, 5.64, 426.13

(56) References Cited

U.S. PATENT DOCUMENTS

| | | | | |
|---|---|---|---|---|
| 6,122,580 A | * | 9/2000 | Autermann | ................... 701/49 |
| 6,253,980 B1 | | 7/2001 | Murakami et al. | |
| 6,606,033 B1 | * | 8/2003 | Crocker et al. | ............. 340/901 |
| 6,791,449 B2 | * | 9/2004 | Dewan | ..................... 340/5.25 |

FOREIGN PATENT DOCUMENTS

| | | |
|---|---|---|
| DE | 100-57-423 A1 | 7/2001 |
| EP | 0 654 383 A2 | 5/1995 |
| EP | 0 654 383 A3 | 2/1997 |
| JP | 09071275 A | 3/1997 |

* cited by examiner

Primary Examiner—Michael Horabik
Assistant Examiner—Vernal Brown
(74) Attorney, Agent, or Firm—Birch, Stewart, Kolasch & Birch, LLP

(57) ABSTRACT

A vehicle ready for a card key and a radio communication system for a vehicle which utilizes a card key wherein transmission and reception functions are incorporated in a card key to be loaded onto a vehicle, thereby allowing communication between vehicles. A card key loaded on a two-wheeled vehicle communicates with a first card key loaded in a first card key receiving slot of a four-wheeled vehicle. Further, a microphone, a speaker and a transmitter-receiver are provided on a helmet for a driver, and the card key communicates also with the transmitter-receiver on the helmet. Similarly, a card key loaded on a second two-wheeled vehicle communicates with a second card key loaded in second card key receiving slot of the four-wheeled vehicle and the transmitter-receiver of the helmet worn by the driver of the second two-wheeled vehicle.

15 Claims, 44 Drawing Sheets

FIG. 8(a)
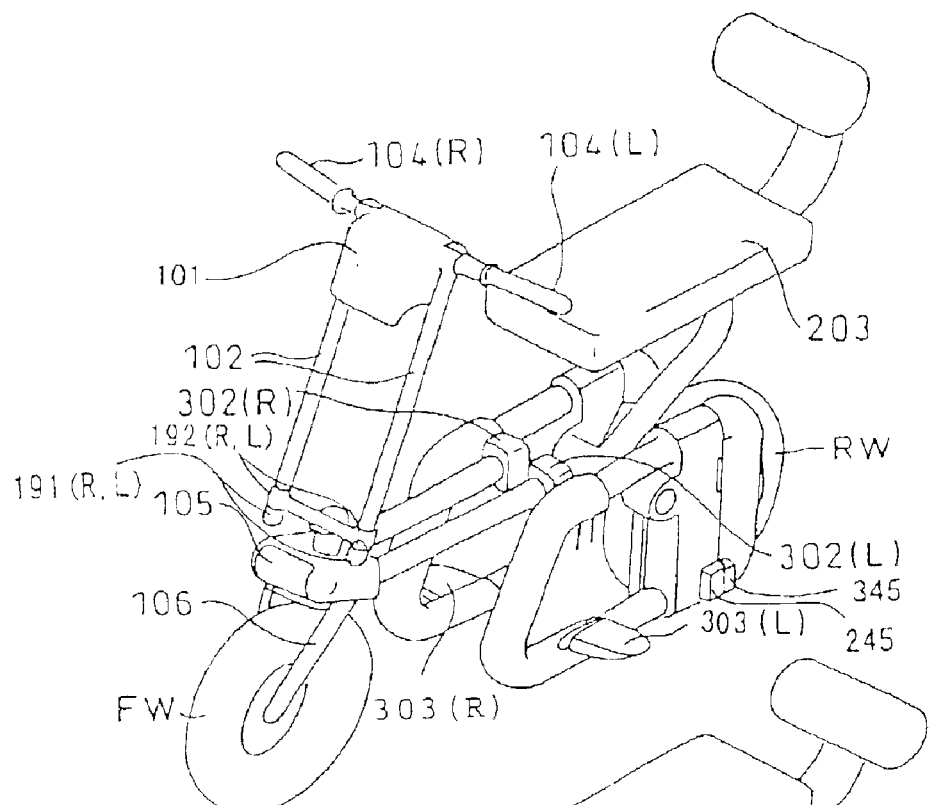
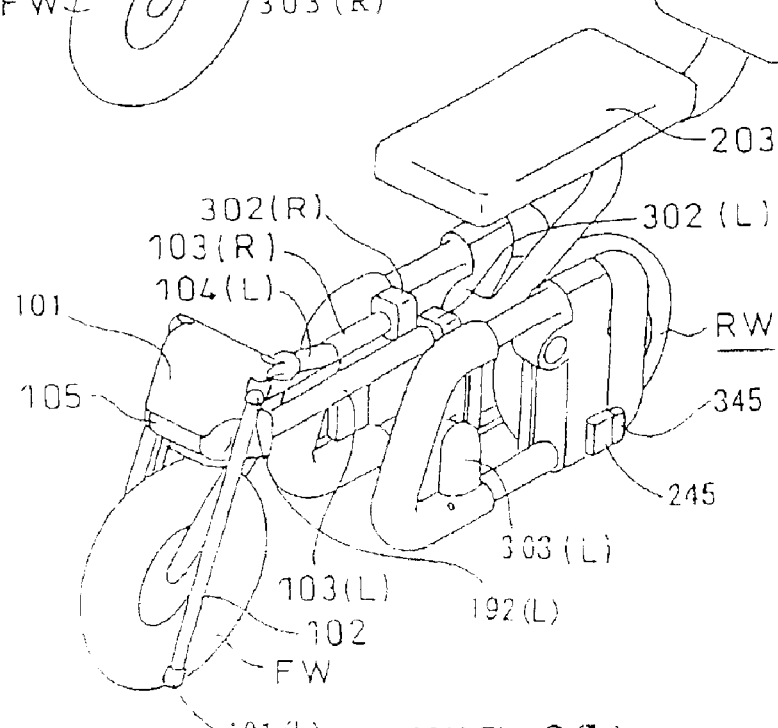
FIG. 8(b)

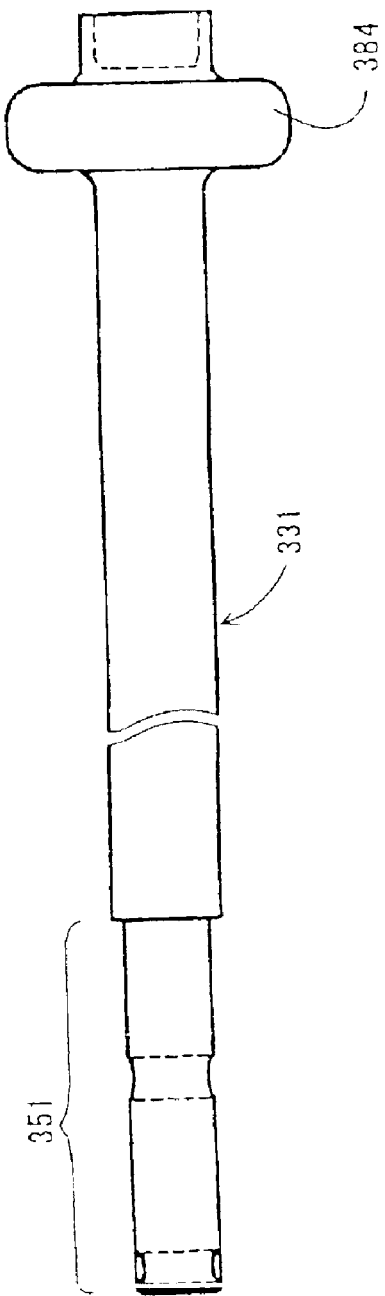
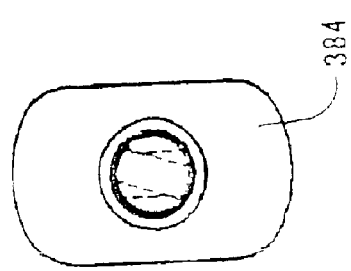
FIG. 14(b)
FIG. 14(a)

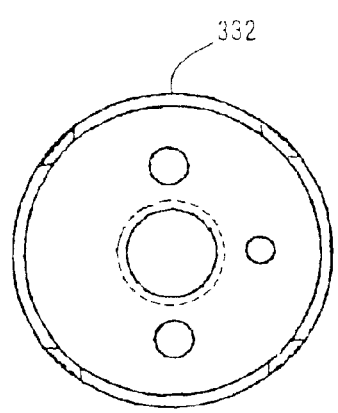 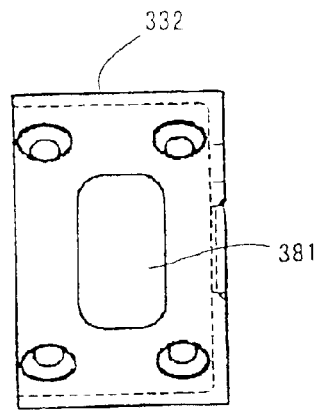
FIG. 15(a)  FIG. 15(b)
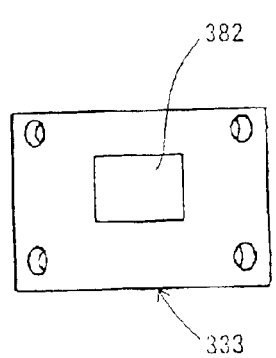 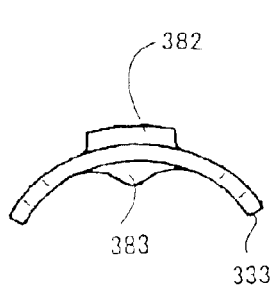 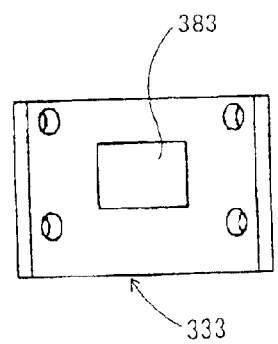
FIG. 16(a)  FIG. 16(b)  FIG. 16(c)

US 6,879,241 B2

VEHICLE READY FOR CARD KEY AND RADIO COMMUNICATION SYSTEM WHICH UTILIZES CARD KEY

CROSS-REFERENCE TO RELATED APPLICATIONS

The present application claims priority under 35 U.S.C. §119 to Japanese Patent Application No. 2001-304452 filed on Sep. 28, 2001, the entire contents thereof is hereby incorporated by reference.

BACKGROUND OF THE INVENTION

1. Field of the Invention

This invention relates to a vehicle ready for a card key and a radio communication system for a vehicle which utilizes a card key, and more particularly to a vehicle ready for a card key and a radio communication system for a vehicle which utilizes a card key wherein each card key has transmission and reception functions.

2. Description of Background Art

A vehicle theft prevention apparatus which utilizes a card key has been popularized. In the official gazette of Japanese Patent Laid-Open No. Hei 9-71275, a vehicle control apparatus is disclosed which reads an ID stored in a card key loaded thereon and collates and discriminates the ID. Then, if it is confirmed that the card key loaded is a regular card key, the control apparatus cancels the warning of a vibration alarming apparatus and releases various locking mechanisms to enable a running state.

Diversification of the leisure has proceeded such that desirable form of sightseeing is to use a two-wheeled vehicle which can be carried on a one-box, four-wheeled car. Once the four-wheeled car has been driven to a destination, and the user determines the place as a base, the user can then remove the two-wheeled from the its box in the car and make a tour around neighboring sightseeing places using the two-wheeled vehicle. In this instance, it is desirable that a car navigation apparatus or an acoustic apparatus such as a car stereo apparatus incorporated in the four-wheeled vehicle can be utilized also for the two-wheeled vehicle.

Meanwhile, thanks to advancement of the semiconductor technique, it has become easy to incorporate an IC into a card to provide transmission and reception functions to the card. If this technique is applied to a card key to be loaded on a vehicle so that the card key functions as an IC card incorporating transmission and reception functions in the vehicle, then the value of the card key can be increased. However, conventionally no attempt has been made to load an IC card onto a vehicle to achieve various functions.

It is an object of the present invention to solve the subject of the prior art described above and provide a vehicle ready for a card key and a radio communication system for a vehicle which utilizes a card key wherein transmission and reception functions are incorporated in a card key to be loaded onto a vehicle thereby to allow communication between vehicles.

SUMMARY AND OBJECTS OF THE INVENTION

In order to solve the subject described above, the present invention provides a card key having transmission and reception functions. The card key is removably loaded on each of a plurality of vehicles and each of the card keys transmits and receives data received from the vehicle on which the card key is loaded.

With the characteristics described above, since communication between vehicles is allowed, a function incorporated only in one of the vehicles can be made available to and used by the other vehicles.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 8(*a*) and (*b*) are views (part 1) showing a method of contracting the motor-driven two-wheeled vehicle;

FIGS. 14(*a*) and (*b*) are front and side elevational views of a lock shaft;

FIGS. 15(*a*) and (*b*) are front and side elevational views of a rubber case;

FIGS. 16(*a*), (*b*), and (*c*) are front surface, side elevational and rear surface views of a lock rubber member;

DETAILED DESCRIPTION OF THE PREFERRED EMBODIMENTS

Figure 1:
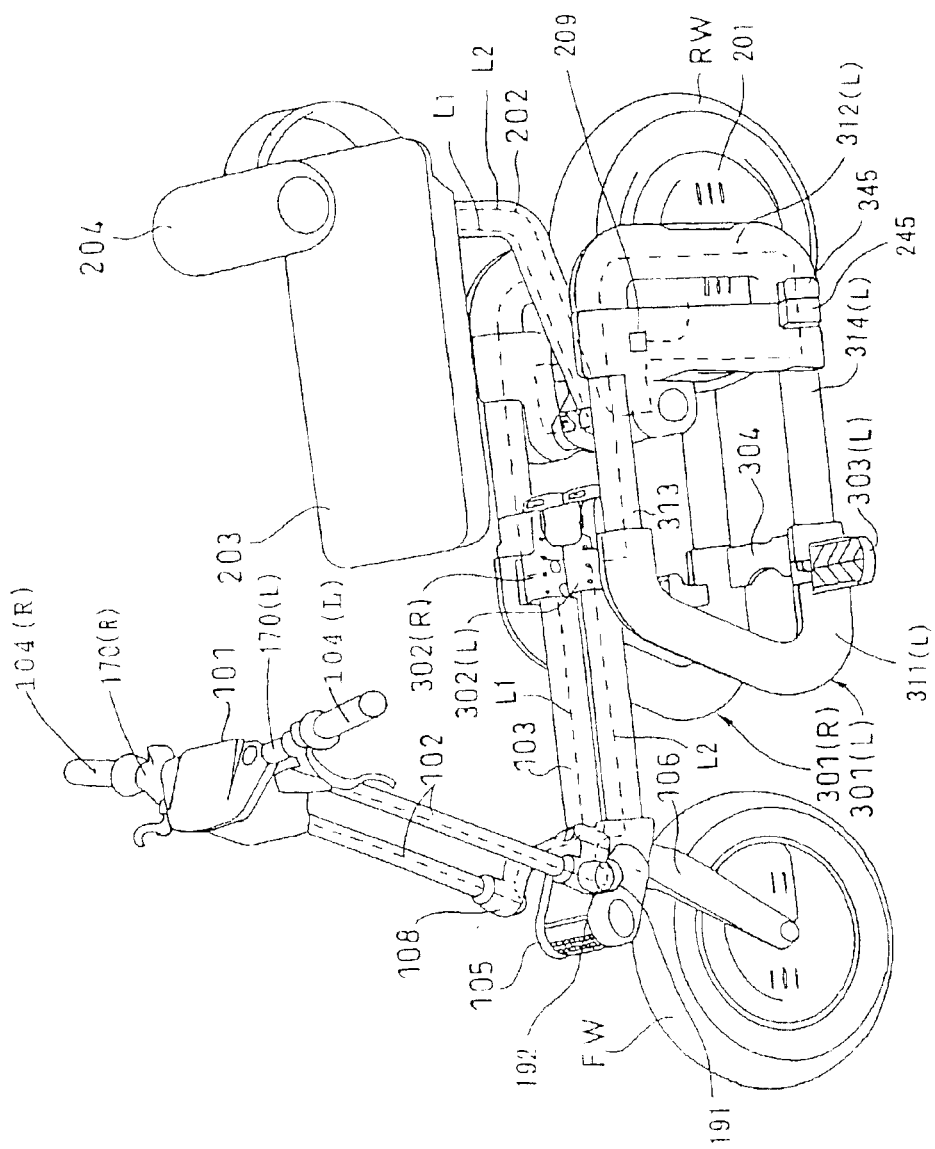
FIG. 1 is a perspective view of a motor-driven two-wheeled vehicle of an embodiment of the present invention.
Figure 2:
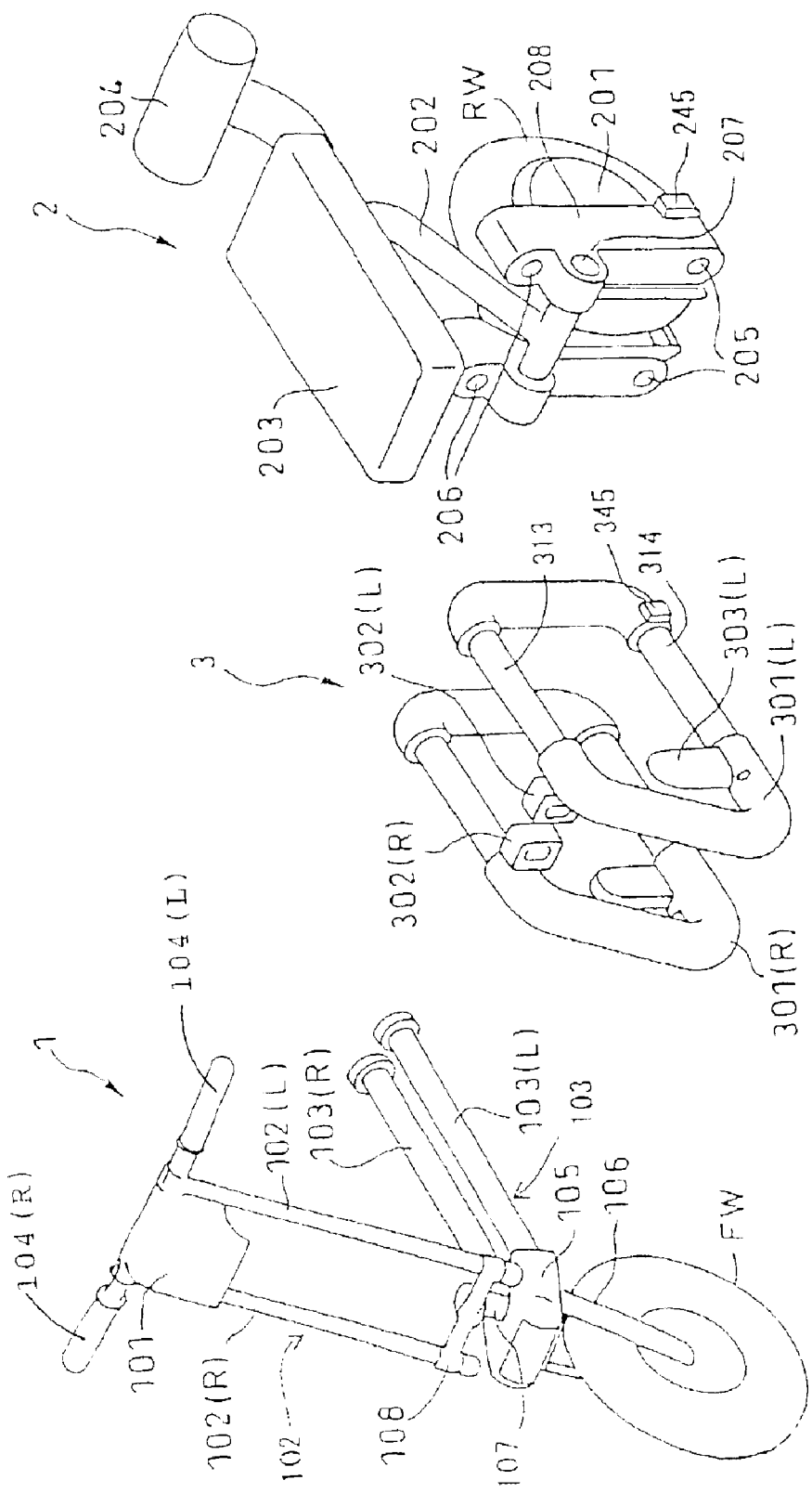
FIG. 2 is a view showing a frame structure of the motor-driven two-wheeled vehicle.

FIG. 1 is a perspective view of a motor-driven two-wheeled vehicle of the contraction accommodation type of an embodiment of the present invention. As shown in FIG. 2, the motor-driven two-wheeled vehicle includes, as principal components, a front frame 1 for supporting a front wheel FW and a steering mechanism for the front wheel FW, and a rear frame 2 for supporting a rear wheel RW serving as a driving wheel and a driving mechanism for the rear wheel RW. Also provided is a center frame 3 for supporting the front and rear frames 1 and 2 and for allowing sliding movement of the front and rear frames 1 and 2 in forward and backward directions so that they can be extended and contracted in the forward and backward direction.

The front frame 1 includes, as principal components thereof, a front fork 106 for supporting the front wheel FW in a cantilever-like fashion from the left side, a handle bridge 108 connected to an upper end 107 of the front fork 106, and a pair of right and left handle shafts 102(R, L) supported for upward and downward sliding movement at the opposite ends of the handle bridge 108. A pair of right and left handle grips 104(R, L) split and are fastened to upper ends of the handle shafts 102(R, L), a meter unit 101 for supporting upper portions of the handle shafts 102(R, L) for turning motion, and a head pipe 103 of a tuning fork shape includes two head pipe shaft portions 103(R, L) extending rearwardly for supporting the front fork 106 for steering motion.

The rear frame 2 includes, as principal components thereof, a swing arm 201 for supporting the rear wheel RW, in which a drive motor is built, in a cantilever-like fashion from the left side, a swing shaft 207 for supporting the swing arm 201 for rocking motion, a seat post 202 supported for turning motion by the swing shaft 207, and a pair of left and right side components 208 for supporting the swing shaft 207. A seat 203 and a back rest 204 are attached to the seat post 202.

Each of the side components 208(R, L) has two openings 205 and 206 provided at upper and lower portions thereof and extending in the forward and backward direction therethrough. A secondary battery as a driving source and a control unit are accommodated below the seat 203 as hereinafter described in detail. Connectors 245(R, L) of connector pairs for electrically connecting the rear frame 2 and the center frame 3 are provided on the opposite outer sides of the side components 208(R, L).

The center frame 3 includes a pair of right and left frame bodies 301(R, L) disposed in parallel to each other, and a pair of guide rollers 302(R, L) are secured to upper front portions of the frame bodies 301(R, L), respectively. A pair of steps 303(R, L) are provided at lower front portions of the frame bodies 301(R, L) such that they can be accommodated when they are pivoted upwardly. Connectors 345(R, L) for fitting with the connectors 245(R, L) of the connector pairs are provided on the opposite sides of rear portions of the frame bodies 301(R, L) for electrically connecting the center frame 3 and the rear frame 2.

In the configuration described above, the shaft portions 103(R, L) of the front frame 1 are inserted in openings of the guide rollers 302(R, L) of the center frame 3, and upper frame pipes 313 and lower frame pipes 314 of the center frame 3 are fitted in the openings 205 and 206 of the side components 208 of the rear frame 2.

The battery is accommodated (refer to FIG. 37) below the seat 203 together with the control unit. Wiring lines L1 and L2 including a power supply line are connected to the battery and a signal line is connected to the control unit. The wiring line L2 which is laid along the frame on the left side of the vehicle body is connected to the drive motor in the swing arm 201 through a switch 209 and extends into the center frame 3 through a pair of connectors 245 and 345.

Further, the wiring line L2 extends to the head pipe shaft portion 103(L) of the front frame 1 through a pair of connectors 161 and 162 (refer to FIG. 20) which are provided at rear ends of the guide roller 302(L) and the head pipe shaft portion 103(L) and fit with each other. Furthermore, the wiring line L2 is connected to the meter unit 101 through a pair of connectors 191 and 192 which are provided at an end of the handle shaft 102(L) and each of the opposite ends of the handle bridge 108.

Also the other wiring line L1 laid along the frame on the right side of the vehicle body extends into the center frame 3 and the front frame 1 in a similar manner except that it is not connected to the switch 209.

Next, a method of accommodating the motor-driven two-wheeled vehicle described above into a private four-wheeled vehicle is described. The motor-driven two-wheeled vehicle of the present embodiment is accommodated in a state wherein the vehicle body thereof is contracted in the forward and backward direction in a trunk space secured rearwardly of a rearmost seat in the four-wheeled vehicle. The height of the ceiling of the cabin continues to the rear of the four-wheeled vehicle like a so-called one-box car, or two-box car.

Figure 3:
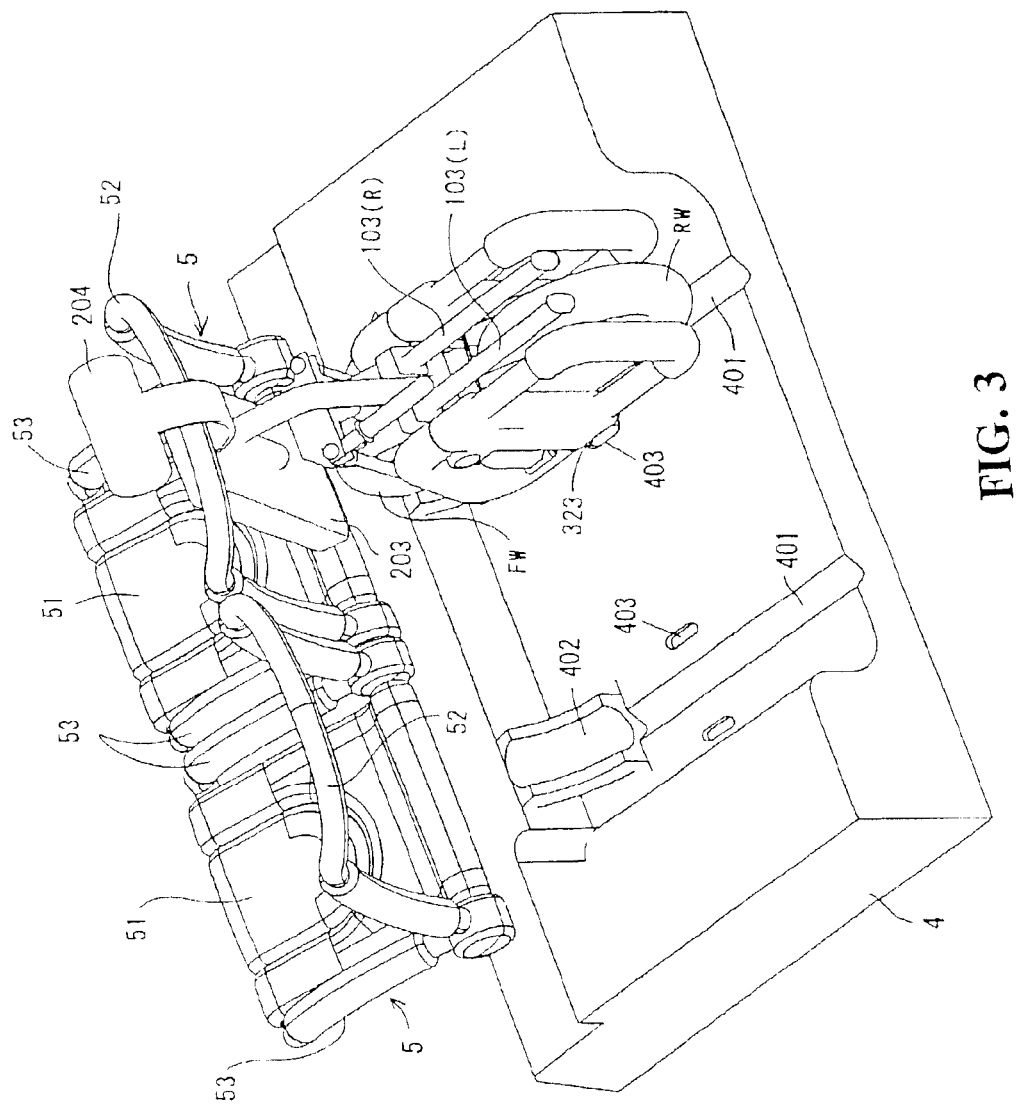
FIG. 3 is a perspective view of the motor-driven two-wheeled vehicle in a state wherein it is accommodated in a trunk space rearwardly of a rear seat as viewed from rearwardly upwards.
Figure 4:
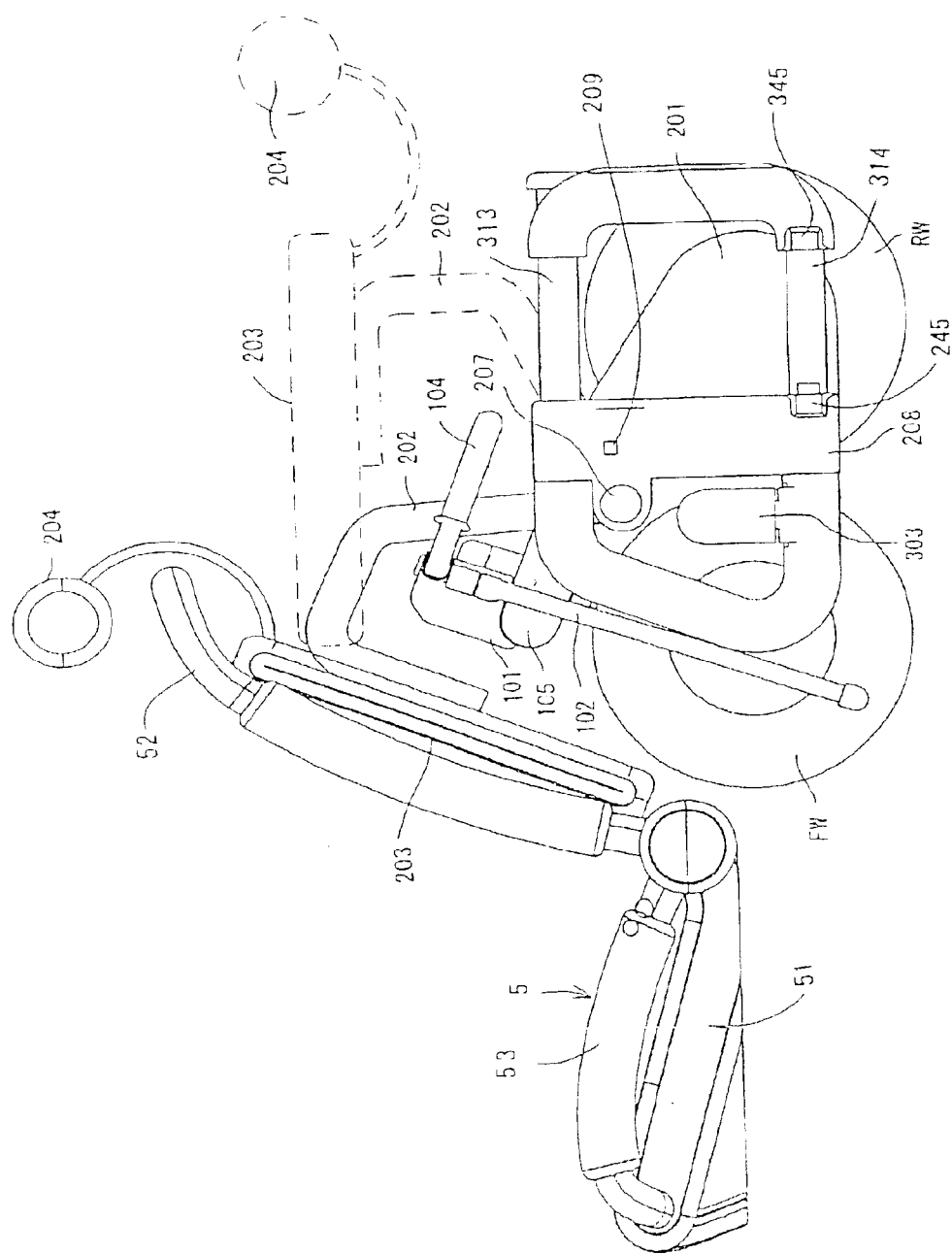
FIG. 4 is a side elevational view of the motor-driven two-wheeled vehicle in a state wherein it is accommodated in the trunk space rearwardly of the rear seat.

FIG. 3 is a perspective view of the motor-driven two-wheeled vehicle of the present embodiment accommodated in a trunk space rearwardly of a rear seat as viewed downwardly from a rear upper location on the left side of the four-wheeled vehicle. FIG. 4 is a side elevational view of the same.

An accommodation panel 4 is incorporated in a trunk space secured rearwardly of rear seats 5 of a vehicle. In the present embodiment, two motor-driven two-wheeled vehicles can be accommodated in a leftwardly and rightwardly juxtaposed relationship. A wheel guide groove 401 and a wheel receiver 402 are provided at each of left and right portions of the accommodation panel 4.

Each of the rearmost seats 5 includes a seat bearing surface 51, a seat back frame 52, and a pair of hold bars 53 provided on the opposite side of the seat bearing surface 51 and has a light-weighted structure without a back rest and a head rest provided therefor. With the rearmost seat 5, when the seat post 202 of the motor-driven two-wheeled vehicle accommodated rearwardly is pulled up forwardly, the seat 203 functions as a back rest and the back rest 204 functions as a head rest.

Figure 5:
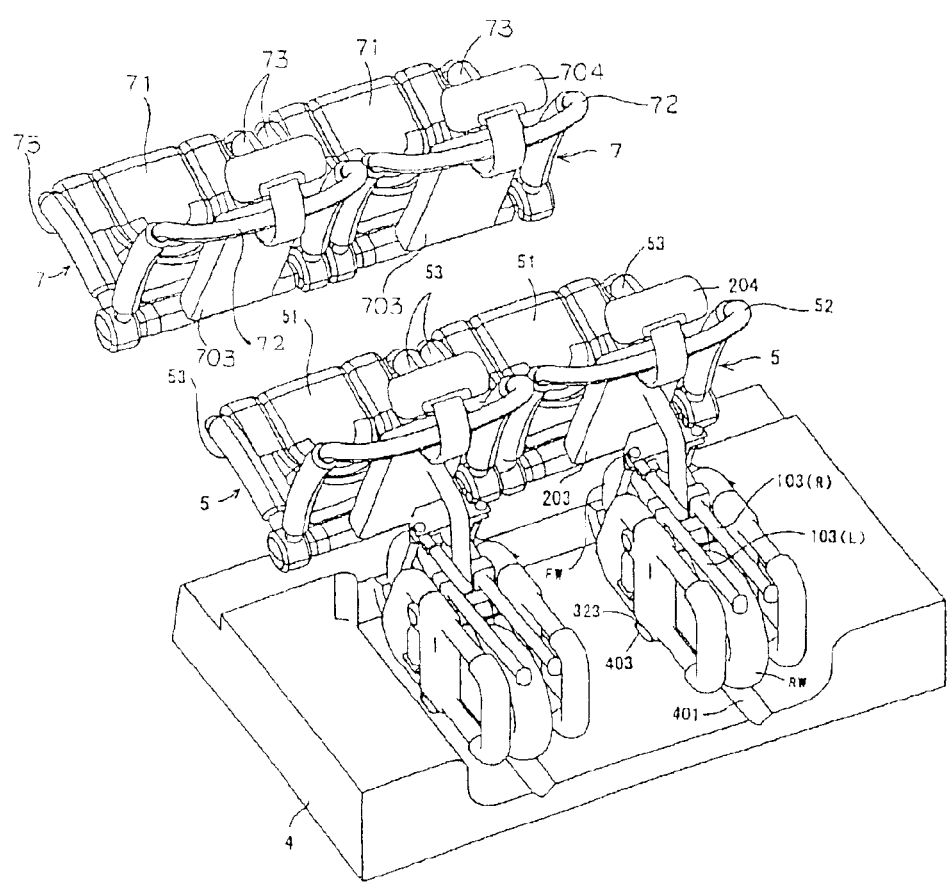
FIG. 5 is a view showing a manner wherein the designs of a front seat and a rear seat are consistent.

Further, in the present embodiment, in order to provide the seat design with consistency as shown in FIG. 5, the bearing surfaces 51 and 71 of the rear seats 5 and the other seats 7, seat back frames 52 and 72, and hold bars 53 and 73 are individually formed in a common design. Back rests 703 and head rests 704 attached fixedly to the other seats 7 are formed in a common design to the seats 203 and the back rests 204 of the two-wheeled vehicle, respectively. Consequently, the consistency of the design of the rearmost seats 5 and the design of the other forward seats 7 in a state wherein the seat posts 202 of the two-wheeled vehicle accommodated in the trunk space are pulled up is assured.

Now, a method of loading the motor-driven two-wheeled vehicle described above into the vehicle is described with reference to FIGS. 6 and 7.

Figure 6:
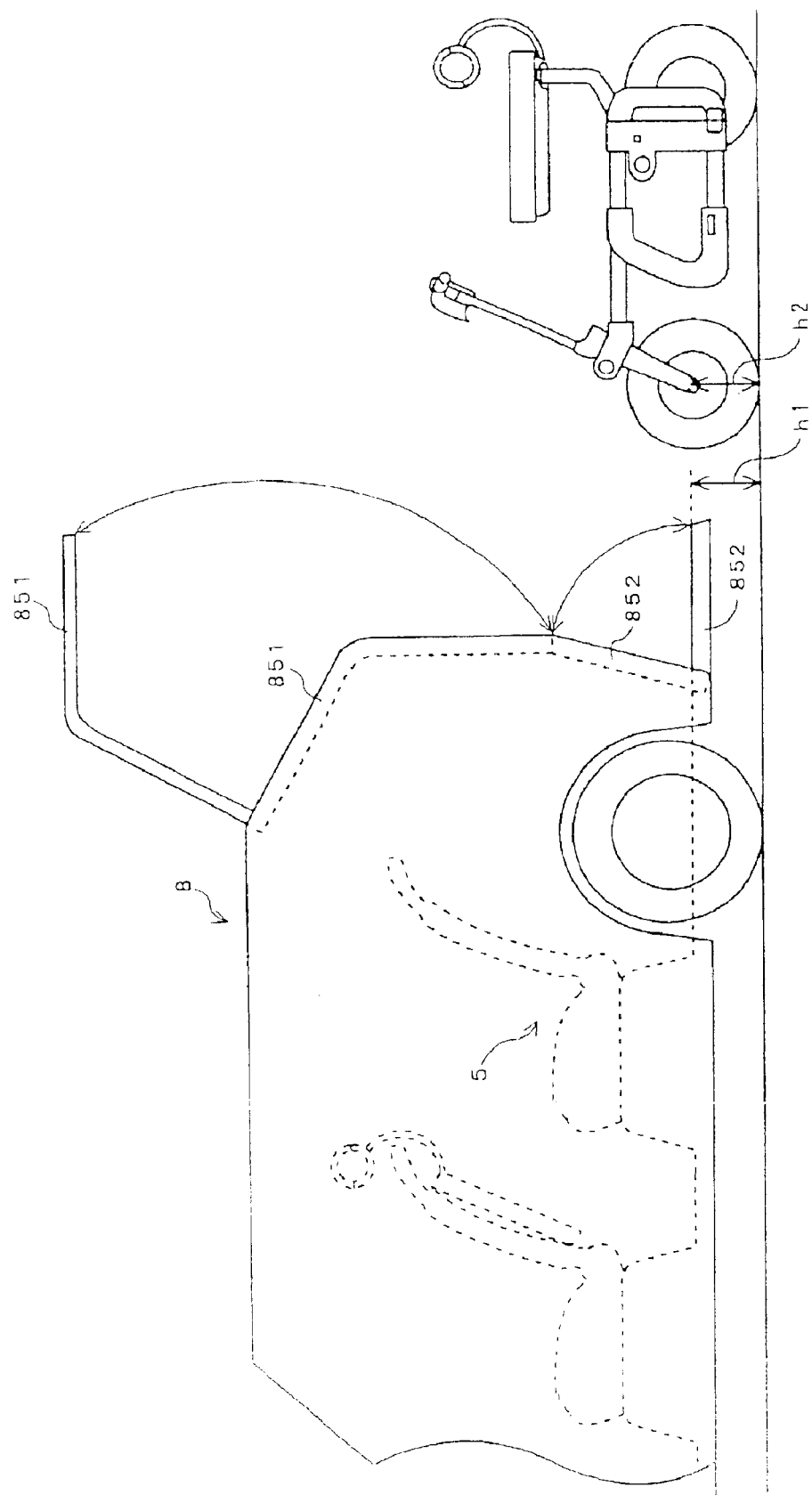
FIG. 6 is a view (part 1) showing a method of loading the motor-driven two-wheeled vehicle into a four-wheeled vehicle.

As shown in FIG. 6, a rear hatch of a vehicle 8 on which the motor-driven two-wheeled vehicle is carried preferably has a two-door configuration including an upper hatch 851 which pivots upwardly and a lower hatch 852 which pivots open downwardly. The road clearance h1 of the lower hatch 852 in its open state preferably is equal to the axle height h2 of the motor-driven two-wheeled vehicle.

Figure 7:
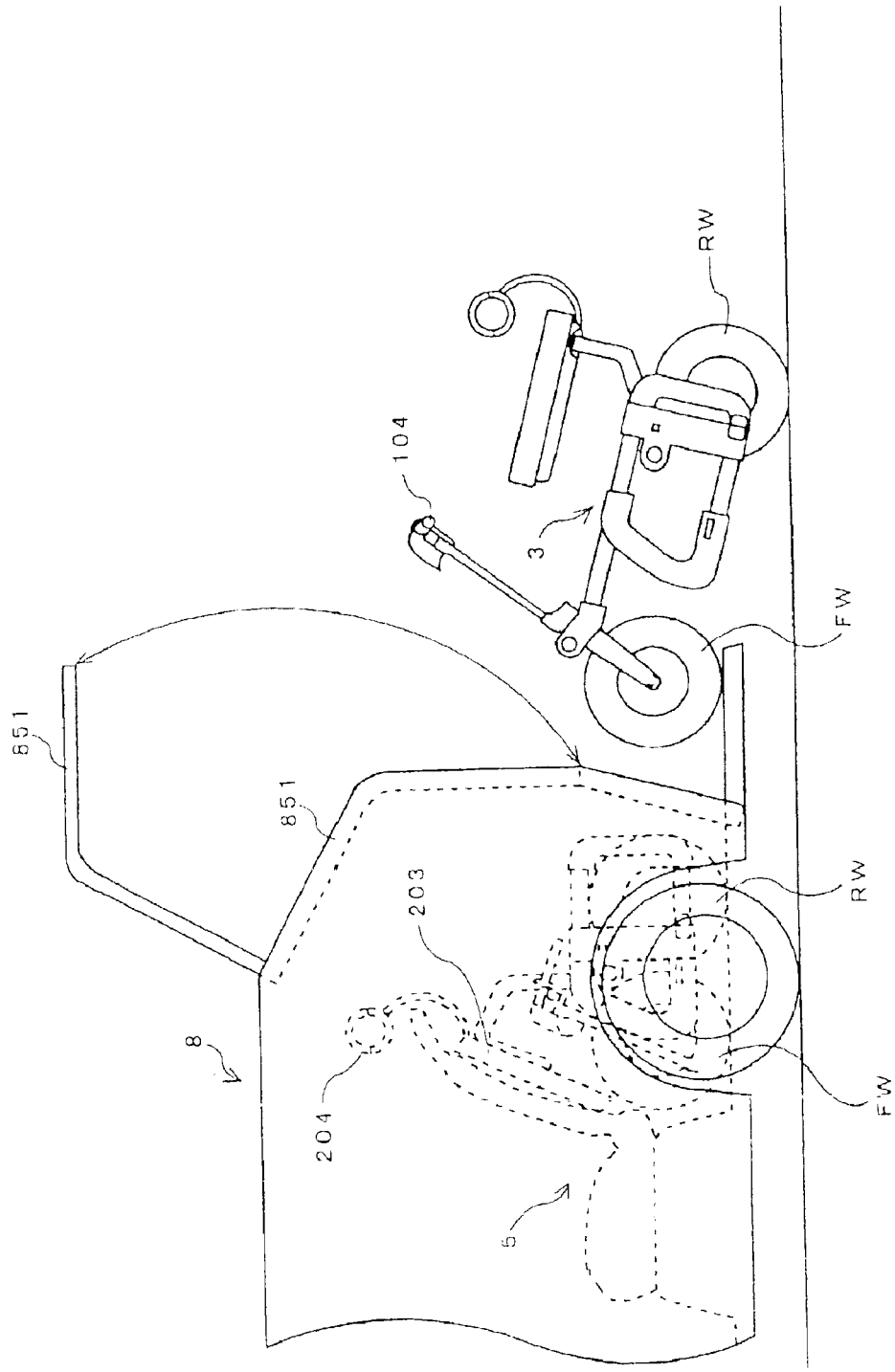
FIG. 7 is a view (part 2) showing a method of loading the motor-driven two-wheeled vehicle into the four-wheeled vehicle.

In order to load the motor-driven two-wheeled vehicle into the trunk space handle grips 104 may first be gripped to pull up the front wheel FW onto the lower hatch 852 as shown in FIG. 7. Then the rear wheel RW is pulled up onto the lower hatch 852, or alternatively, the center frame 3 of the motor-driven two-wheeled vehicle may be gripped to lift the entire vehicle body and carry the vehicle as it is into the trunk space.

Subsequently, the method of accommodating the motor-driven two-wheeled vehicle described above is described with reference to FIGS. 8 to 11. It is to be noted that only an outline of the accommodating operation is described, but the structure of the components for achieving the simple accommodation is hereinafter described in detail.

FIG. 8(a) shows an extended state of the motor-driven two-wheeled vehicle wherein it can run. The front wheel FW is inserted into one of the wheel guide grooves 401 of the accommodation panel 4 until it is abutted with the wheel receiver 402, and then a handle lock which is hereafter described is released. Further, the left and right L-shaped handle shafts 102 are turned to the inner side by 90, and the handle shafts 102 are pushed downwardly together with the meter unit 101 as shown in FIG. 8(b). Thereupon, since the fitting engagement of the connectors 191(R, L) and 192(R, L) is cancelled and they are spaced away from each other, electric connection of the power supply/signal lines to the meter unit 101 and a headlight unit 105 is cut.

Figure 9A:
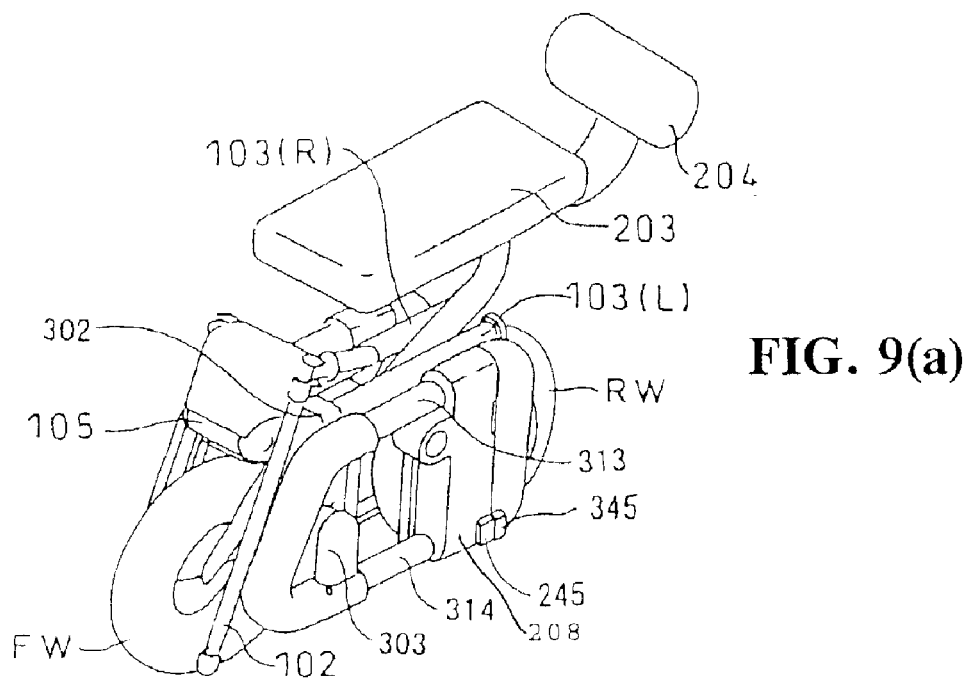
FIGS. 9(*a*) and (*b*) are views (part 2) showing a method of contracting the motor-driven two-wheeled vehicle.

Thereafter, a front lock which is hereinafter described is released and the head pipe shaft portions 103(R, L) of the front frame 1 are retracted along the guide rollers 302 of the center frame 3 as shown in FIG. 9(a). At this time, since the fitting engagement of the connectors 161 and 162 (refer to FIG. 20) for electrically connecting the front frame 1 and the center frame 3 is cancelled and the connectors 161 and 162 are spaced away from each other, the electric connection between the frames is cut.

Figure 10:
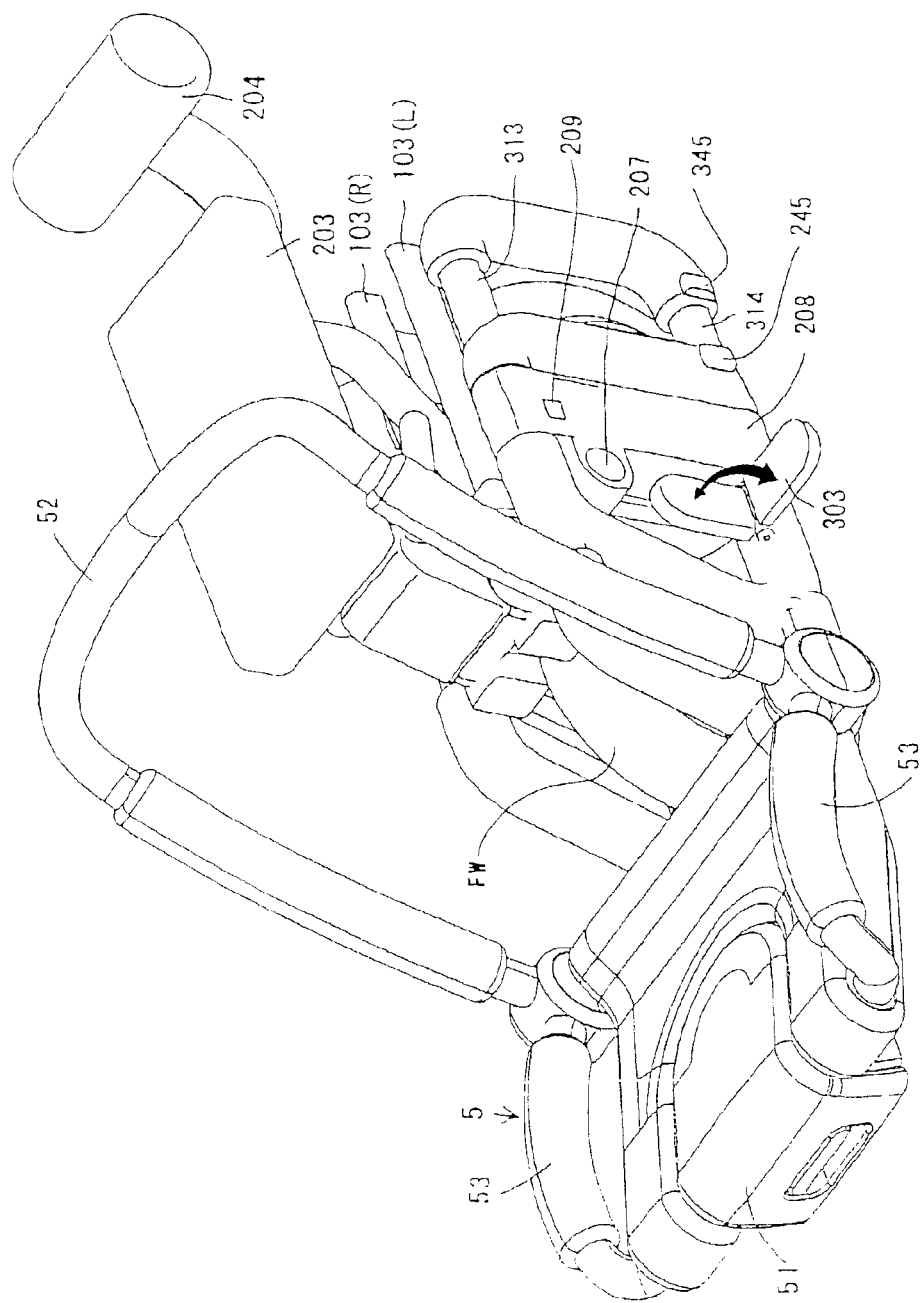
FIG. 10 is a view (part 1) showing a method of accommodating the motor-driven two-wheeled vehicle.

Then, after a rear lock which is hereinafter described is released, the advancement switch 209 provided on one of the side components 208 is operated to cause the rear wheel RW to be driven at a low speed in the advancing direction so that the rear frame 2 is advanced as shown in FIG. 10. At this time, the direction of the frames is made coincide with the forward and backward direction of the four-wheeled vehicle so that the rear wheel RW may advance in the wheel guide groove 401.

It is to be noted that the accommodation procedure into the four-wheeled vehicle is not limited to this, but, for example, the vehicle body may be carried onto the accommodation panel 4 of the trunk space while it is in a state wherein the handle shafts 102 are pushed down together with the meter unit 101, whereafter the advancement switch 209 is operated in a state wherein the front wheel FW abuts the wheel receiver 402. In this instance, the rear frame 2 and the center frame 3 advance simultaneously with respect to the front frame 1.

Figure 9B:
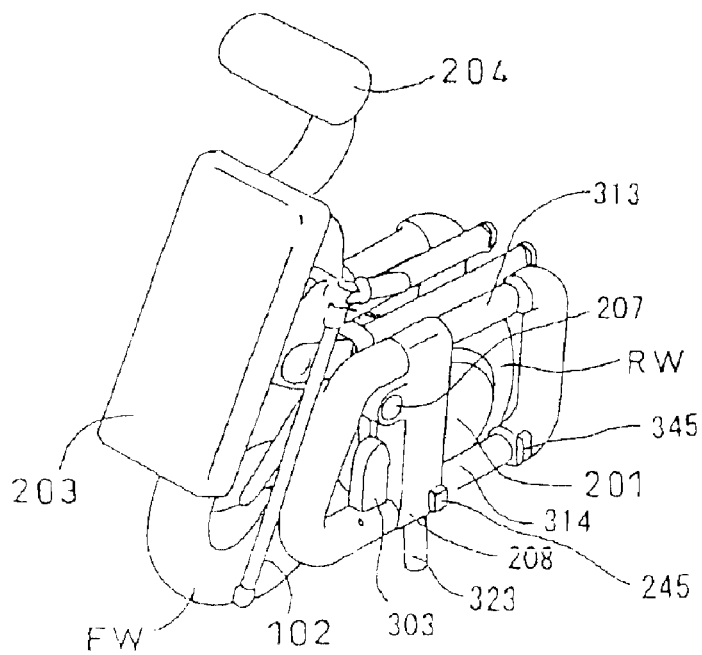
Figure 11:
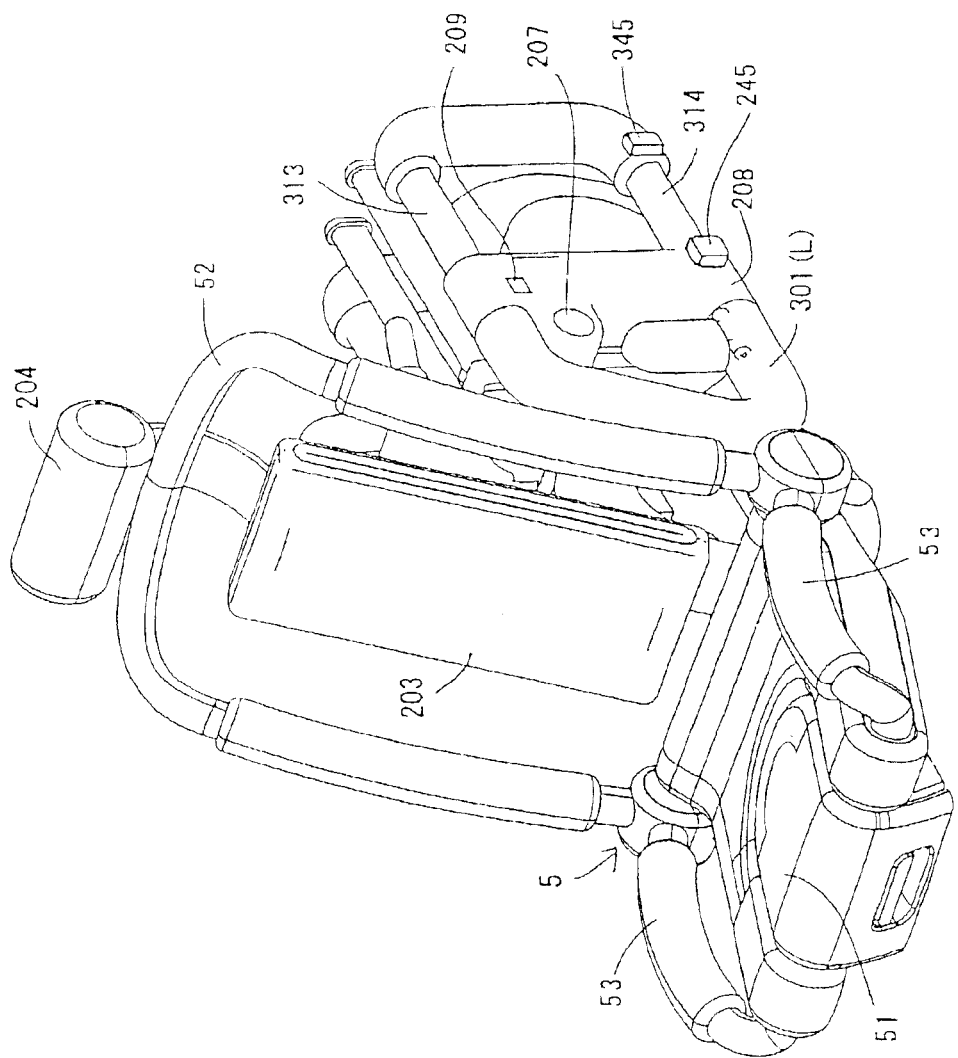
FIG. 11 is a view (part 2) showing a method of accommodating the motor-driven two-wheeled vehicle.

After the contraction of the vehicle body is completed as described above, the seat post 202 is pulled up around the swing shaft 207 as shown FIG. 9(b) and FIG. 11, and the seat 203 and the back rest 204 are pivoted to the back rest position and the head rest position of the rear seat 5, respectively.

In this manner, in the present embodiment, since the two-wheeled vehicle is composed of the three frames 1, 2, and 3 and the front frame 1 and the rear frame 2 are mounted for sliding movement in the forward and backward directions with respect to the center frame 3, the overall length of the two-wheeled vehicle in its accommodation state can be reduced even further. Further, since such further reduction in the forward and backward direction can be achieved, the two-wheeled vehicle can be accommodated in the trunk room such that the forward and backward direction thereof coincides with the forward and backward direction of the four-wheeled vehicle. Accordingly, only if the seat post 202 of the two-wheeled vehicle is pivoted, then the seat 203 and the back rest 204 thereof can be caused to function as the back rest and the head rest of a rear seat 5, respectively.

In other words, in the present embodiment, since the seat 203 and the back rest 204 of the motor-driven two-wheeled vehicle accommodated in the trunk space of the four-wheeled vehicle function as part of a rear seat of the vehicle to achieve common use of the functioning parts, reduction in both space and weight are achieved.

Further, in the present embodiment, since electric connection between the components is cut during the process of contracting the vehicle body frame, not only is the operation of disconnection simplified, but also such disconnection can be positively ensured.

It is to be noted that, in the present embodiment, in response to the turning of the swing shaft 207, a fastening element 323 (described later) protrudes downwardly from the bottom of the side component of the center frame 3 and further through an opening 403 of the accommodation panel 4, as shown in FIG. 3 and FIG. 9(b), until it is connected to the other fastening element (not shown) provided on the vehicle body side.

The fastening element 323 has an electric contact of a charging line provided thereon, and when the fastening element 323 is fastened to the other fastening element, the two fastening elements are mechanically fixed to each other. Simultaneously, charging current is supplied from the power supply line of the vehicle side to the motor-driven two-wheeled vehicle side to charge the secondary battery of the motor-driven two-wheeled vehicle.

Now, the structure of each of the frames 1, 2, and 3 and connection mechanisms of them are described in detail.

Figure 12:
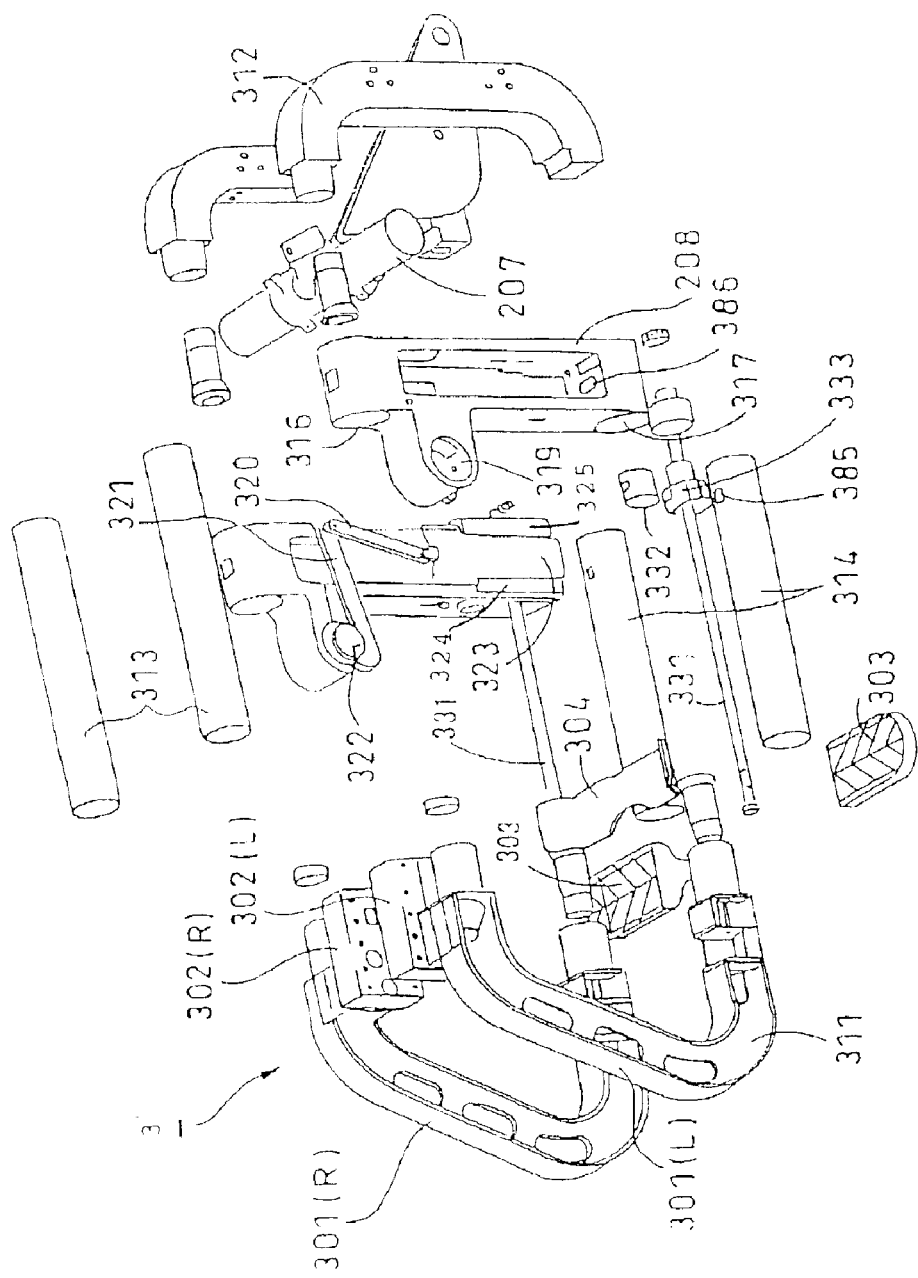
FIG. 12 is a view showing a connection mechanism between principal parts of a center frame and a rear frame.
Figure 13:
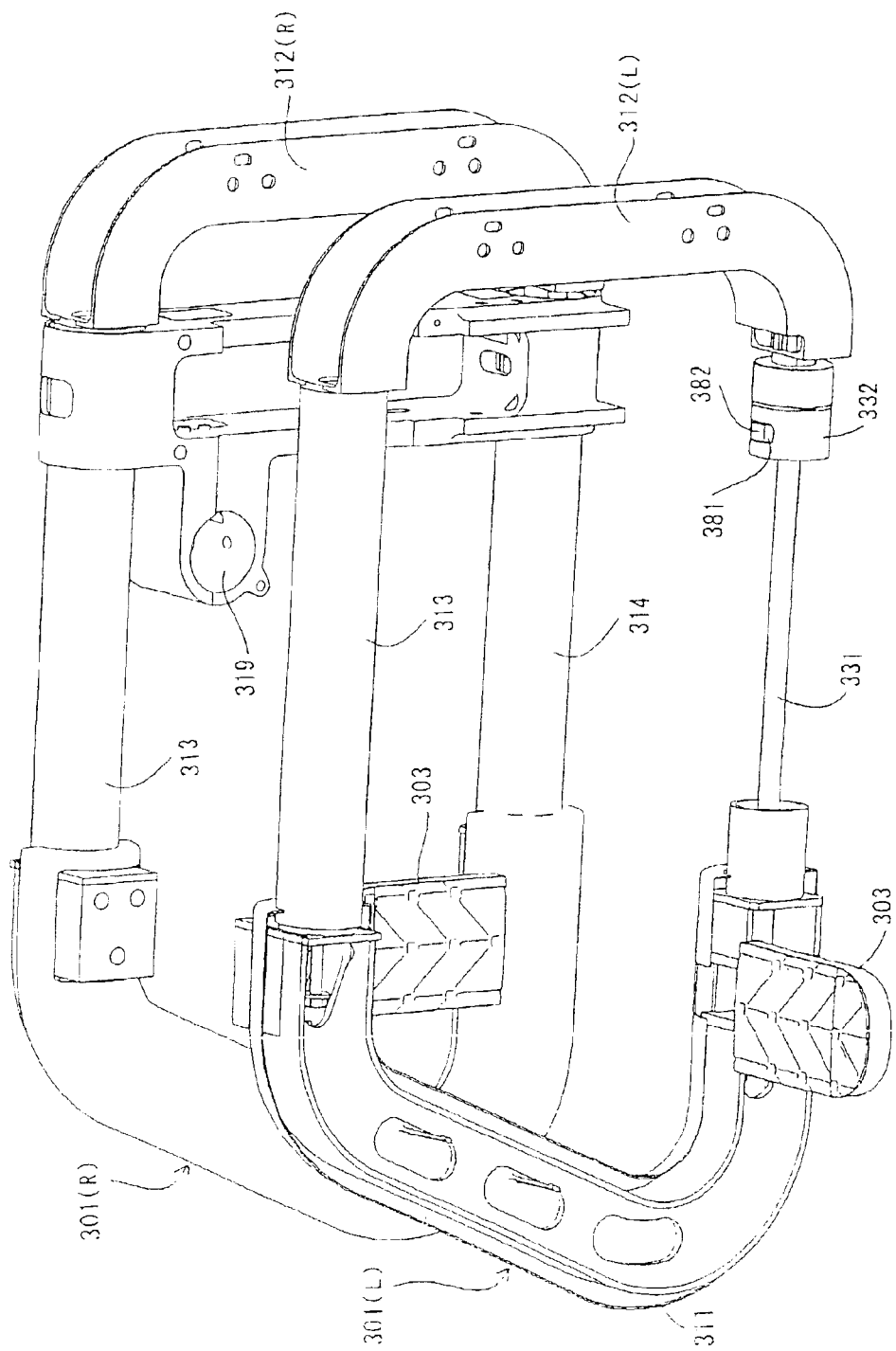
FIG. 13 is a view showing a skeleton structure of the center frame.

FIG. 12 is an exploded view showing principal components of the center frame 3 and a connection mechanism of the center frame 3 to the rear frame 2. FIG. 13 is a view showing a skeleton structure of the center frame 3. In FIGS. 12 and 13, like reference characters to those appearing above denote like or corresponding elements.

The center frame 3 is formed, as described above with reference to FIG. 1, by connecting the pair of right and left frame bodies 301(R, L) disposed in parallel to each other at front lower portions thereof by means of a plate bridge 304. Each of the frame bodies 301 is formed by connecting a front body frame 311 and a rear body frame 312 each of a substantially U shape to each other by means of an upper frame pipe 313 and a lower frame pipe 314 and has a form of a loop of a substantially trapezoidal shape.

Since, in the present embodiment the center frame 3 is formed from the pair of right and left frame bodies 301(R, L) having a loop-like shape, not only the strength and the rigidity of the frame can be raised, but also it can be transported readily when it is carried on a vehicle or the like.

A pair of right and left guide rollers 302(R, L) for supporting the head pipe 103 of the front frame 1 for sliding movement thereon are attached to upper portions of front portions of the frame bodies 301(R, L), respectively.

Each of the side components 208(R, L) of the rear frame 2 has two openings 316 and 317 (FIG. 12) provided at upper and lower portions thereof and extending in the forward and backward direction therethrough. The upper frame pipe 313 and the lower frame pipe 314 are fitted for sliding movement in advance in the openings 316 and 317, respectively. Consequently, the rear frame 2 is supported for sliding movement in the forward and backward directions with respect to the center frame 3. The swing shaft 207 is supported for rotation in the openings 319 formed in the side components 208(R, L) and extending in the leftward and rightward direction through the side components 208(R, L).

On side faces of the side components 208 which oppose to each other, fastening elements 323 connected to the swing shaft 207 through crank mechanisms 322, 320, and 321 are accommodated for upward and downward movement within a range defined by guide stoppers 324 and 325. Each of the fastening elements 323 is moved upwardly or downwardly in an interlocked relationship with a turning movement of the swing shaft 207 when the seat post 202 is pushed up as described above with reference to FIG. 3 and FIG. 9(b).

Since the two-wheeled vehicle and the four-wheeled vehicle are fastened to each other by the fastening element 323 in an interlocking relationship with a turning movement of the swing shaft 207, not only is the necessity for a fastening operation eliminated, but also a situation in that the two-wheeled vehicle is not fastened to the four-wheeled vehicle is prevented. Further, since an electric contact is provided on the fastening element 323 such that the battery of the two-wheeled vehicle is charged from the power supply of the four-wheeled vehicle through the fastening element 323, the battery can be charged making use of a traveling time without specifically connecting a charging apparatus to the battery.

A rear lock mechanism for locking and unlocking sliding movement of the side components 208 to and from the lower frame pipe 314 in an interlocking relationship with a taking in/out movement of the step 303 is built in the lower frame pipe 314. The lock mechanism includes a lock shaft 331, a lock rubber member 333, and a rubber case 332 as principal components thereof, and the step 303 is used as an operating element for the lock mechanism.

FIG. 14(a) is a view showing a front elevation and FIG. 14(b) is a side elevation of the lock shaft 331. A small diameter portion 351, into which the step 303 is inserted, is formed at a portion in the proximity of a front end portion of the lock shaft 331. Also, a cam 384 is formed at a portion in the proximity of a rear end portion of the lock shaft 331. The lock shaft 331 is supported for rotation at the opposite ends thereof and is rotated in an interlocking relationship with a taking in/out movement of the step 303. The cam 384 lies horizontally when the step 303 is in its accommodated position, but stands uprightly when the step 303 is turned into an operable position.

FIG. 15(a) is a view showing a front elevation and FIG. 15(b) is a side elevation of the rubber case 332. FIG. 16(a) is a view showing a front surface view FIG. 16(b) is a side view, and FIG. 16(c) is a rear surface view of the lock rubber member 333.

The lock rubber member 333 is formed from a resilient member of an arcuate shape which is inscribed with the inner surface of the rubber case 332, and has a front surface projection 382 and a back surface projection 383 provided at the center of the front and rear faces thereof. The lock rubber member 333 is securely mounted on the inner side of the rubber case 332 such that the front surface projection 382 thereof projects outwardly through an opening 381 of the rubber case 332.

Figure 17:
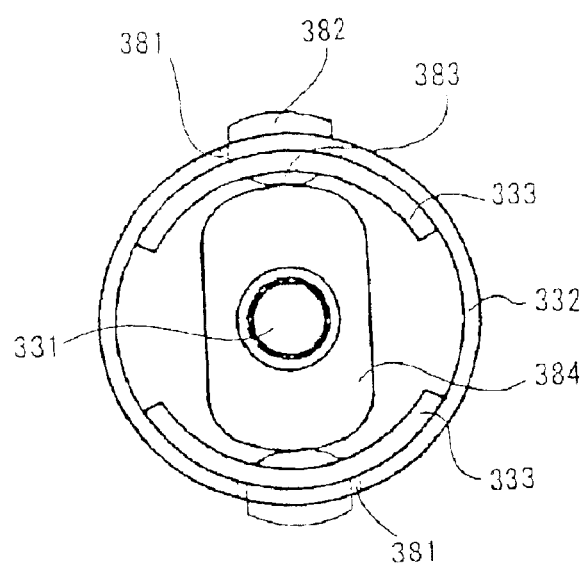
FIG. 17 is a schematic view of (locking) operation of a front lock mechanism.
Figure 18:
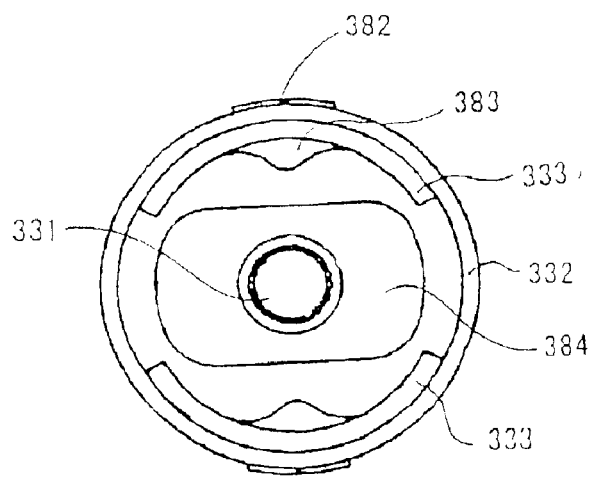
FIG. 18 is a schematic view of (unlocking) operation of the front lock mechanism.

FIGS. 17 and 18 are views illustrating a locking operation by the front lock mechanism composed of the components described above.

In a state wherein the step 303 is turned into an operable position, since the cam 384 assumes a vertical posture in the longitudinal direction as shown in FIG. 17, the back surface projections 383 of the lock rubber members 333 are pushed out by the opposite end portions of the cam 384. This causes the front surface projections 382 thereof to project outwardly by a comparatively great extent through the openings 381 of the rubber case 332. The projected front surface projections 382 extend through openings 385 (FIG. 12) of the lower frame pipe 314 and engage with openings 386 (FIG. 12) provided in the side component 208 to prevent sliding movement of the side component 208.

On the other hand, when the step 303 is in an accommodated state, since the cam 384 assumes a horizontally lying posture as shown in FIG. 18, the front surface projections 382 of the lock rubber members 333 are accommodated in the inside of the rubber case 332. Accordingly, sliding movement of the side component 208 along the lower frame pipe 314 is permitted.

In this manner, since sliding movement of the rear frame 2 with respect to the center frame 3 is locked or unlocked in an interlocking relationship with an operation of turning up/down the steps 303, the necessity for a locking/unlocking operation for exclusive use is eliminated.

Subsequently, a structure of the front frame 1 and a connection structure of the front frame 1 to the center frame 3 are described.

Figure 19:
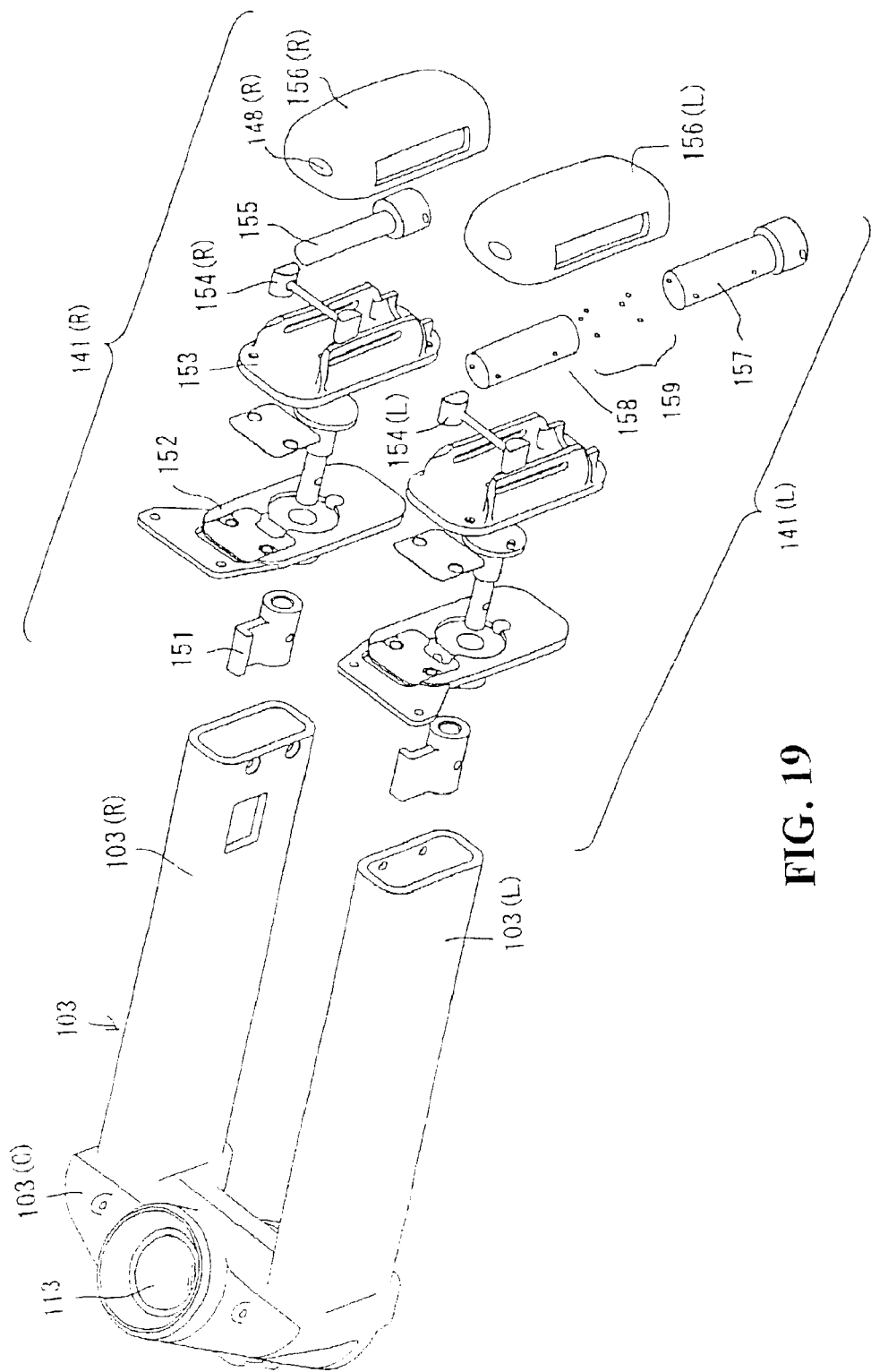
FIG. 19 is a view showing a configuration of a head pipe.

FIG. 19 is an exploded view of the head pipe 103 which is a principal component of the front frame 1. The head pipe 103 includes a base portion 103(c) having a through-hole 113 formed therein for supporting the front fork 106 for steering movement, and a pair of right and left head pipe shaft portions 103(R, L) extending rearwardly in parallel to each other from the base portion 103(c), and has a tuning fork-like shape as a whole. Operation elements 141(R, L) of the front lock mechanism for inhibiting sliding movement of the front frame 1 relative to the center frame 3 in an extended state, that is, in a traveling state of the two-wheeled vehicle, are assembled to rear end portions of the head pipe shaft portions 103(R, L), respectively.

The operation element 141(R) includes a hook pipe 151, a base plate 152, a lever plate 153, a lever 154, an arresting pin 155, and a cover 156 as principal components. The other operation element 141(L) is different from the operation element 141(R) in that it includes, in place of the arresting pin 155, an engaging tube 160 which in turn includes an arresting inner tube 157, an arresting outer tube 158, and arresting balls 159 held between the arresting inner tube 157 and the arresting outer tube 158.

Figure 20:
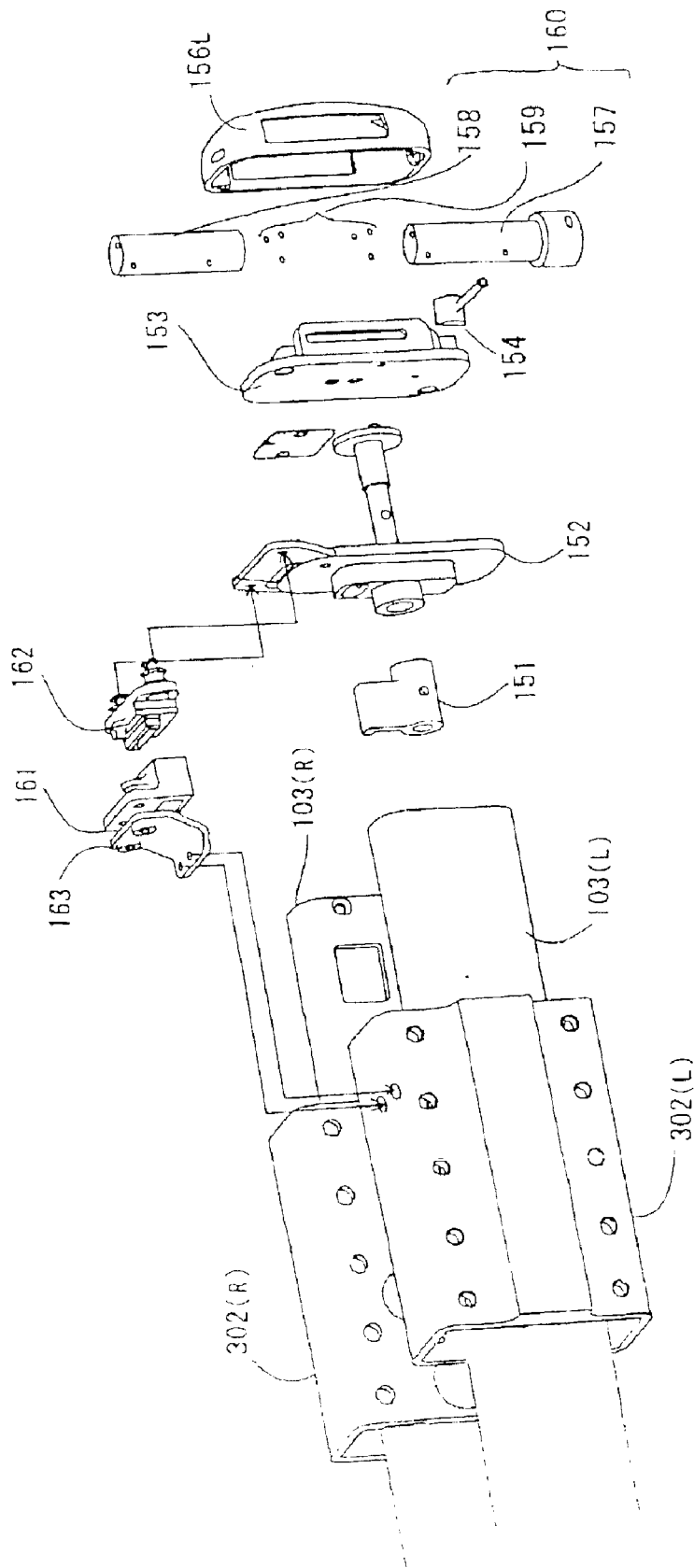
FIG. 20 is an assembly view of the head pipe.

It is to be noted that, in a process of manufacturing the two-wheeled vehicle, the head pipe shaft portions 103(R, L) are fitted into the guide rollers 302 of the center frame 3 in advance as shown in FIG. 20, and thereafter, the operation elements 141 are assembled to the rear end portions of the head pipe shaft portions 103(R, L).

A male connector 162 and a female connector 161 for establishing electric connection between the frames 1 and 2 during contraction of the two-wheeled vehicle, and electrically disconnecting them from each other upon extension of the two-wheeled vehicle, are provided on each of the guide rollers 302 of the center frame 3 and each of the operation elements 141 of the front frame 1, respectively. The female connector 161 is securely screwed to an upper portion of the guide roller 302 through a mounting member 163. The male connector 162 is securely screwed to the base plate 152 of the operation element 141.

Figure 21:
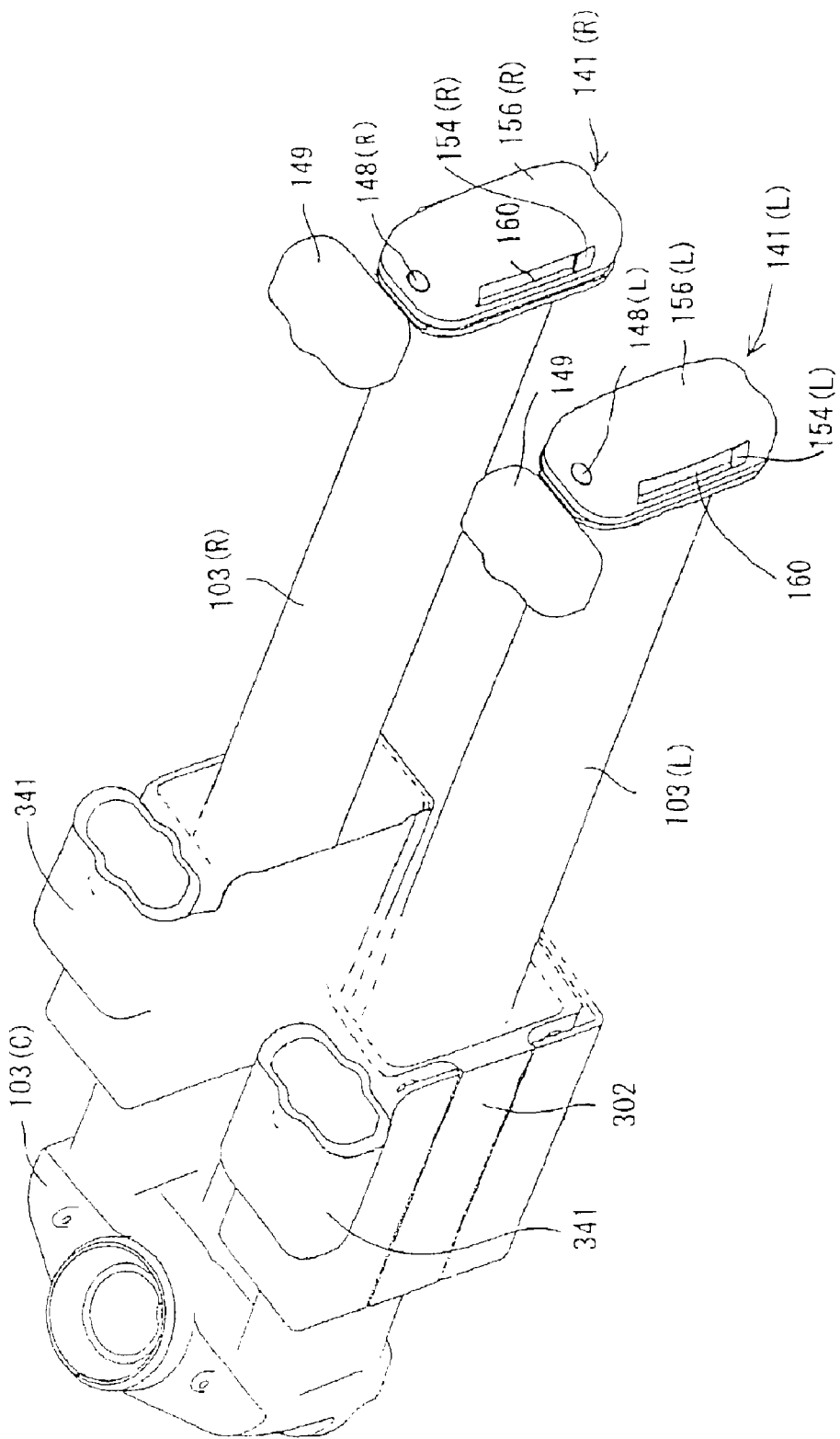
FIG. 21 is a view showing a positional relationship between a head pipe shaft portion and a guide roller in a contracted state of a frame.

FIG. 21 is a view showing a positional relationship between the head pipe shaft portions 103(R, L) and the guide rollers 302 in a frame contraction state, that is, in an accommodation state. Each of the female connectors 161 is covered with a cover 341 together with the guide roller 302, and each of the male connectors 162 is covered with a cover 149.

In the frame contraction state, since the guide rollers 302 are positioned forwardly of the head pipe shaft portions 103(R, L) and the male connectors 162 and the female connectors 161 are spaced away from each other, the front frame 1 and the center frame 3 are electrically isolated from each other. The operation elements 141 assume an uprightly standing posture.

Figure 22:
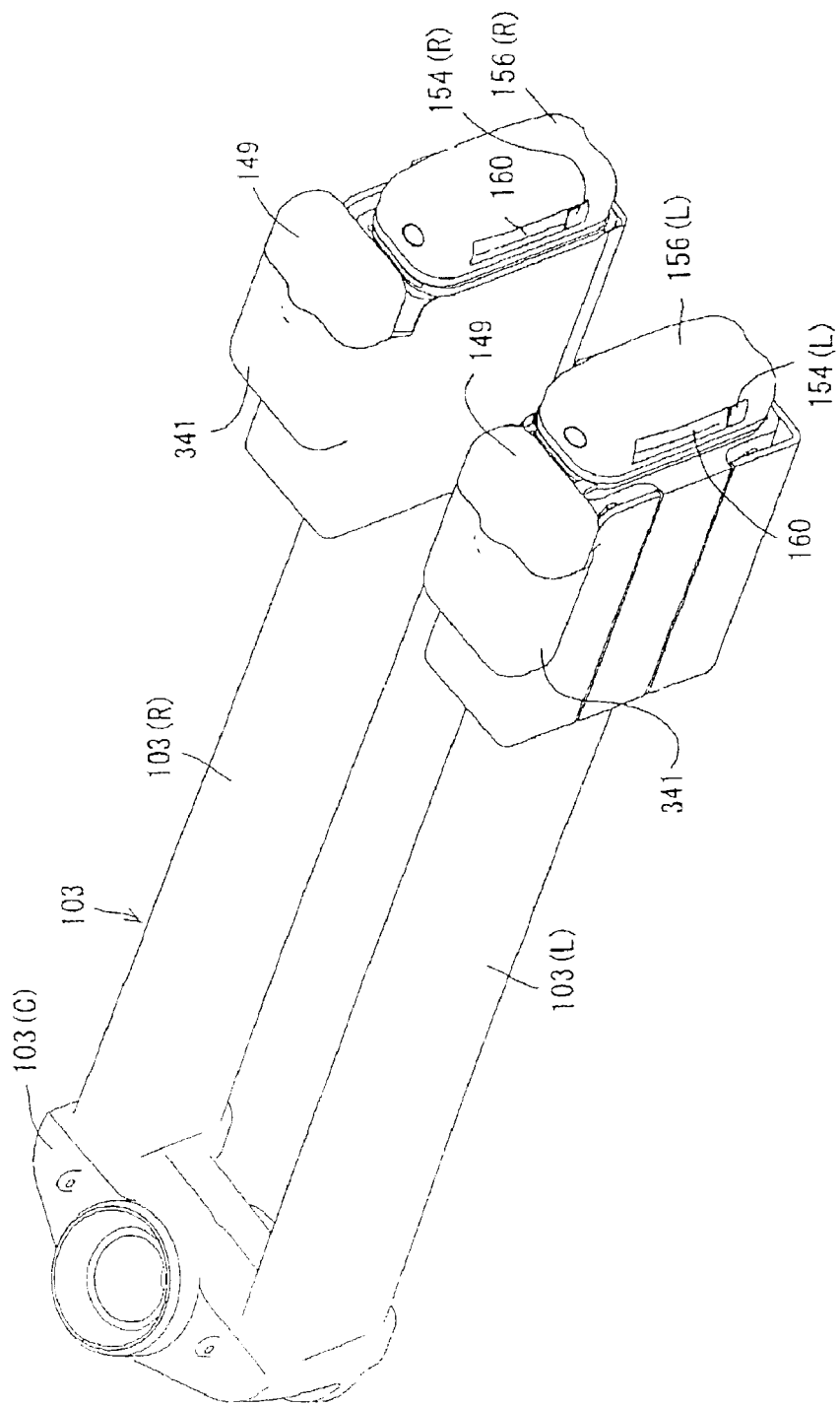
FIG. 22 is a view showing a positional relationship between the head pipe shaft portion and the guide roller in an extended state of the frame.

If, from this contraction state, the frame is extended to a maximum extension position, that is, to a traveling permission state of FIG. 22, then the guide rollers 302 are slidably moved to the last end portions of the head pipe shaft portions 103(R, L), and the male connectors 162 and the female connectors 161 are fit together. Consequently, they are electrically connected to each other, and electric connection between the front frame 1 and the center frame 3 is established.

In this manner, since the electric connection between the components is cut in the accommodation state wherein the frame is contracted, even if a switch is operated in error while the two-wheeled vehicle is in its accommodation state, no electric apparatus is made to be operative.

Further, since the electric connection by the connectors 161 and 162 is established only at the maximum extension position of the vehicle body frame, traveling of the two-wheeled vehicle when the vehicle body frame has not completely extended can be prevented.

Figure 23:
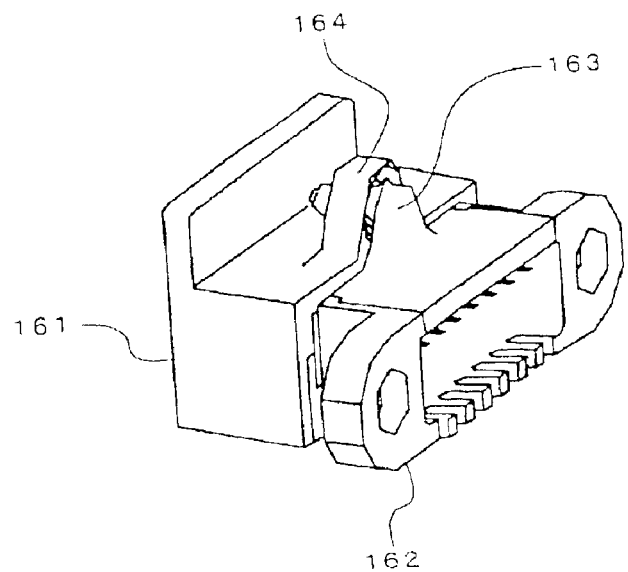
FIG. 23 is a perspective view showing a fitting state of connectors 161 and 162.
Figure 24:
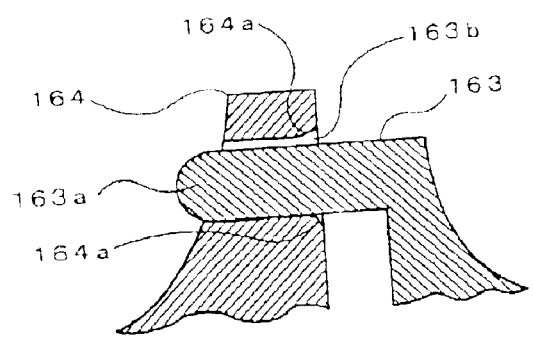
FIG. 24 is a view showing a configuration of guide members of the connectors.

FIG. 23 is a perspective view showing the connectors 161 and 162 in their fitted state. Guide members 164 and 163 for guiding the connectors 161 and 162 relatively to appropriate positions when they are fitted with each other are formed at upper portions of the connectors 161 and 162, respectively. As shown in FIG. 24, the guide member, 164 has a through-hole 163b formed therein, and a tapered portion 164a for facilitating guidance of a pin member 163a of the mounting member 163 into the through-hole 163b is formed at an opening end of the through-hole 163b.

Figure 46A:
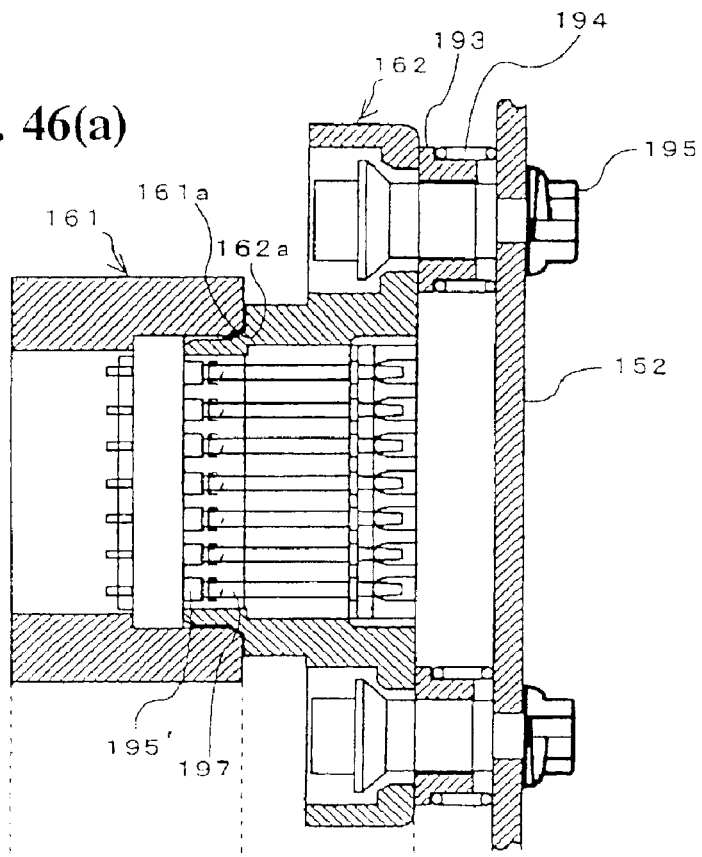
FIGS. 46(a) and (b) are sectional views of the connectors in a fitting state.
Figure 46B:
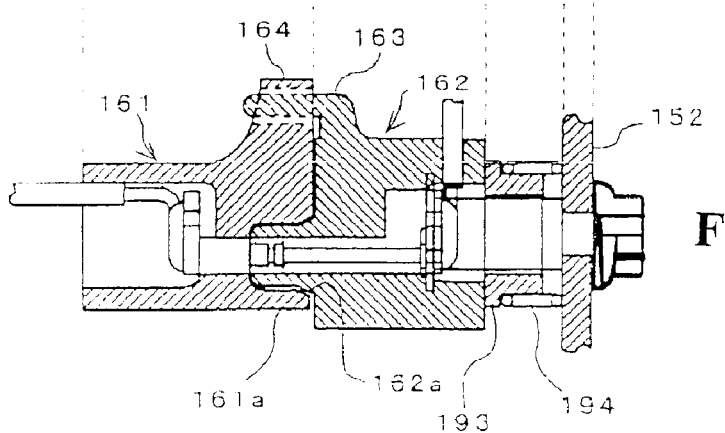

FIG. 46 is a sectional view of the connectors 161 and 162 in the fitting state. In FIG. 46, like reference characters to those appearing above denote like or corresponding elements.

The connector 162 is resiliently mounted on the base plate 152 (FIG. 20) by screws 195 through bosses 193 and springs 194. According to such a mounting method as just described, the connector 162 can normally be maintained in a resiliently floating state with respect to the base plate 152 by the bosses 193 resiliently acted upon by the springs 194. Accordingly, when the guide rollers 302 are slidably moved to the terminal end portions of the head pipe shaft portions 103(R, L) as shown in FIG. 22, even if the relative position between the connectors 161 and 162 suffers from an error, the error is absorbed. Consequently, a good fit between them can be achieved.

Figure 47A:
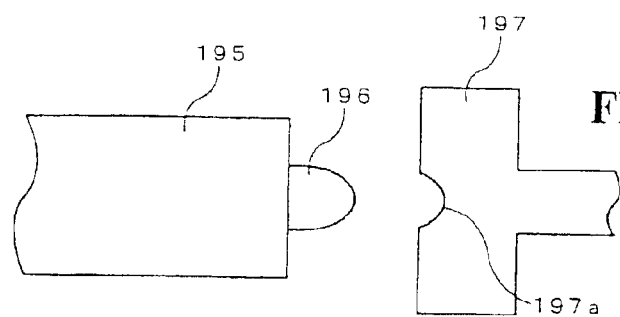
FIGS. 47(a) and (b) are enlarged views of contact portions of the connectors.
Figure 47B:
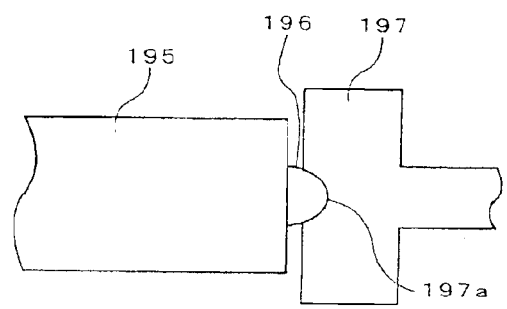

Further, since tapered portions 161a and 162a for facilitating fitting between the connectors 161 and 162 are formed at fitting portions of the connectors 161 and 162 in addition to the guide members 164 and 163, a good fitting state can be achieved. A good fit is made possible, even if the relative position of the connectors 161 and 162 suffers from an error, since they are guided to their normal fitting positions relative to each other, Furthermore, contacts 195' of the female connector 161 are spring pins, and a spring pin 196 projecting resiliently from a tip of each contact 195 is resiliently pressed against a recess 197a provided at an end of a contact 197 of the male connector 162, and as shown in FIG. 47. Accordingly, since vibrations or positional displacement between the connectors 161 and 162 is absorbed, the electric connection at the frame connection portion can always be maintained in a rood condition.

Figure 26A:
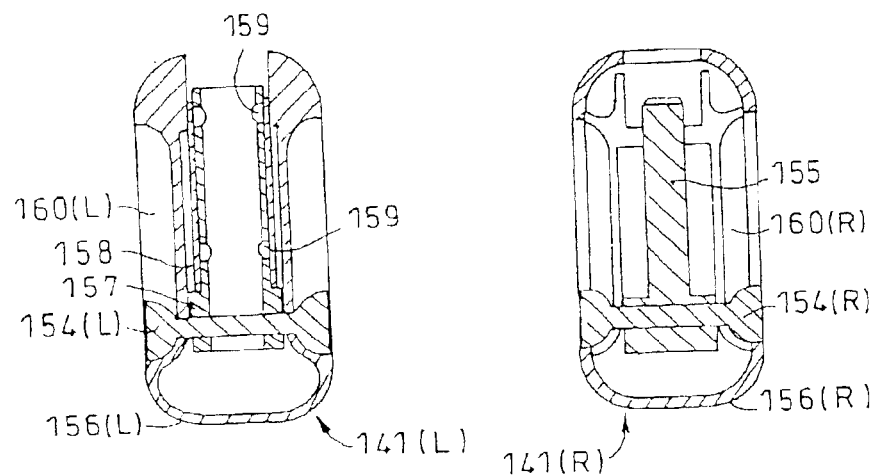
FIGS. 26(a), (b), and (c) are sectional views showing a manner of operation of an operation element.
Figure 26B:
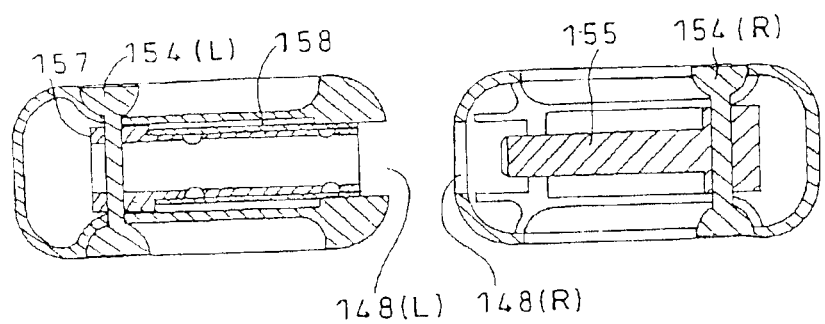

FIG. 26 is a sectional view of the operation elements 141(R, L). After the guide rollers 302 are slidably moved to the terminal ends of the head pipe shaft portions 103(R, L) as shown in FIG. 22, the operation elements 141 are grasped by the left and right hands. When this occurs, the operation element 141(R) on the right side is turned in the counterclockwise direction, and the operation element 141(L) on the left side is turned in the clockwise direction both by 90 from the uprightly standing posture of FIG. 26(a) to the horizontally tying posture of FIG. 26(b).

Figure 26C:
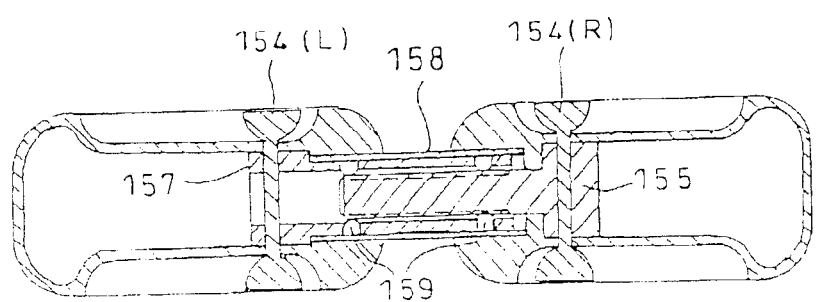
Figure 27:
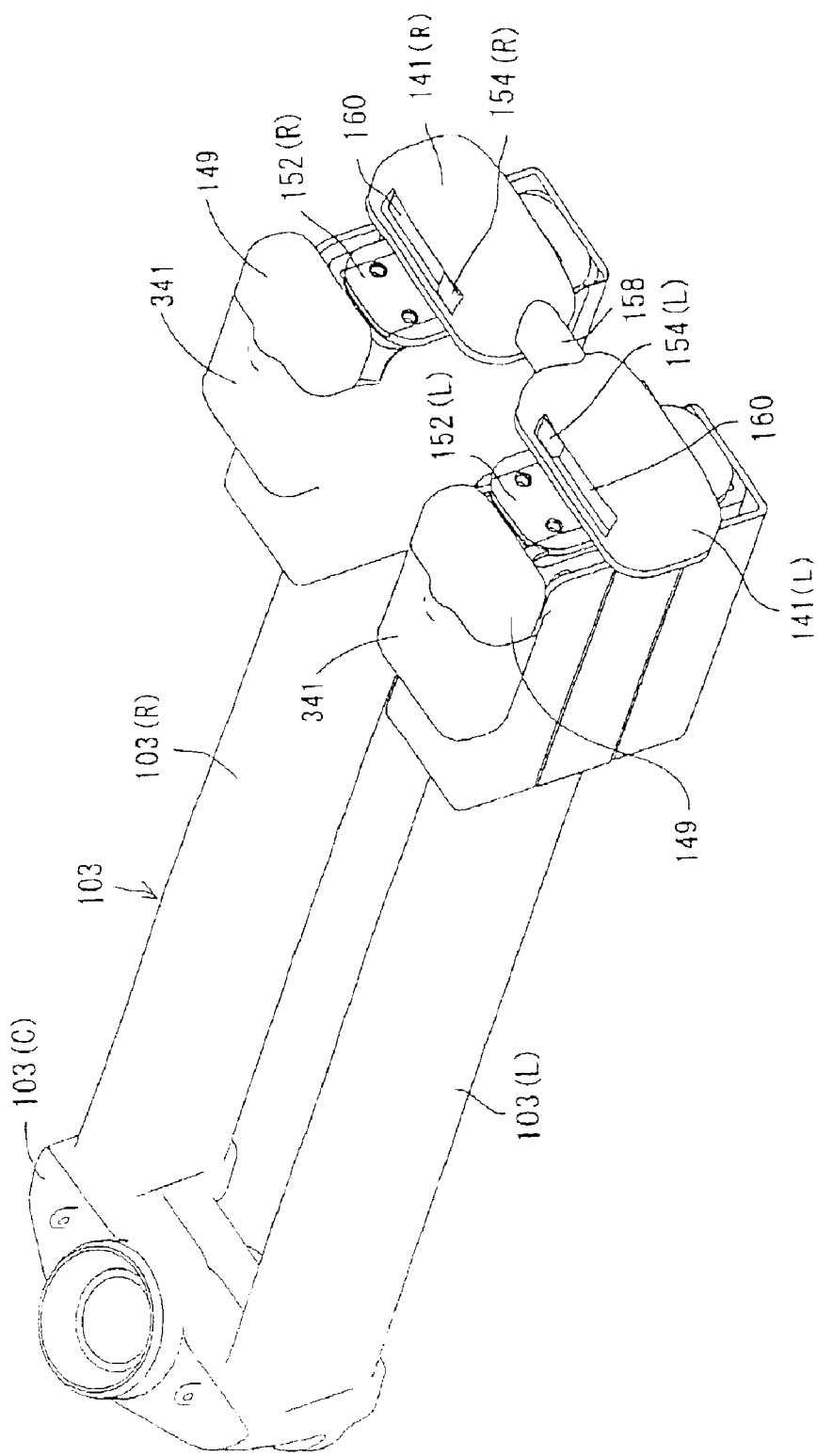
FIG. 27 is a view showing the operation element in a locking state.

Thereafter, the levers 154 of the operation elements 141 are grasped and slidably moved to the inner side as shown in FIG. 26(c). At this time, in the operation element 141(R) on the right side, the arresting pin 155 projects from the opening 148(R), and in the operation element 141(L) on the left side, the engaging tube 160 projects from the opening 148(L). This causes the arresting pin 155 to be inserted into the engaging tube 160 until they are arrested by each other by the arresting balls 159. Consequently, the right and left head pipe shaft portions 103(R, L) are mechanically connected to each other as shown in FIG. 27. Therefore, the frame rigidity during traveling is augmented.

Figure 25:
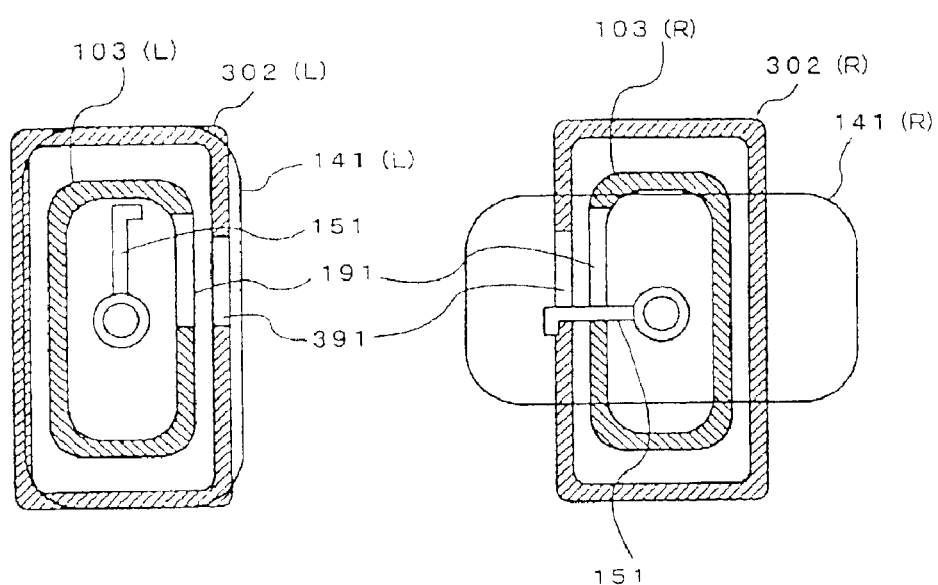
FIG. 25 is a view showing a locking function of the head pipe shaft portion.

Further, in the traveling state wherein the operation elements 141 lie horizontally, the hook pipes 151 (refer to FIG. 19) in the head pipe shaft portions 103(R, L) are pivoted to the inner side by 90 (as shown in FIG. 25), and engage with side portion openings 191' of the shaft portions 103(R, L) and side portion openings 391 of the guide rollers 302. Consequently, the guide rollers 302 and the shaft portions 103(R, L) are locked to each other, thereby inhibiting relative sliding movement therebetween.

In this manner, in the present embodiment, only when the left and right operation elements 141 are turned, is the front frame 1 locked to the center frame 3. Moreover, since the operation elements are disposed in the proximity of each other, a locking/unlocking operation can be performed readily.

Figure 28:
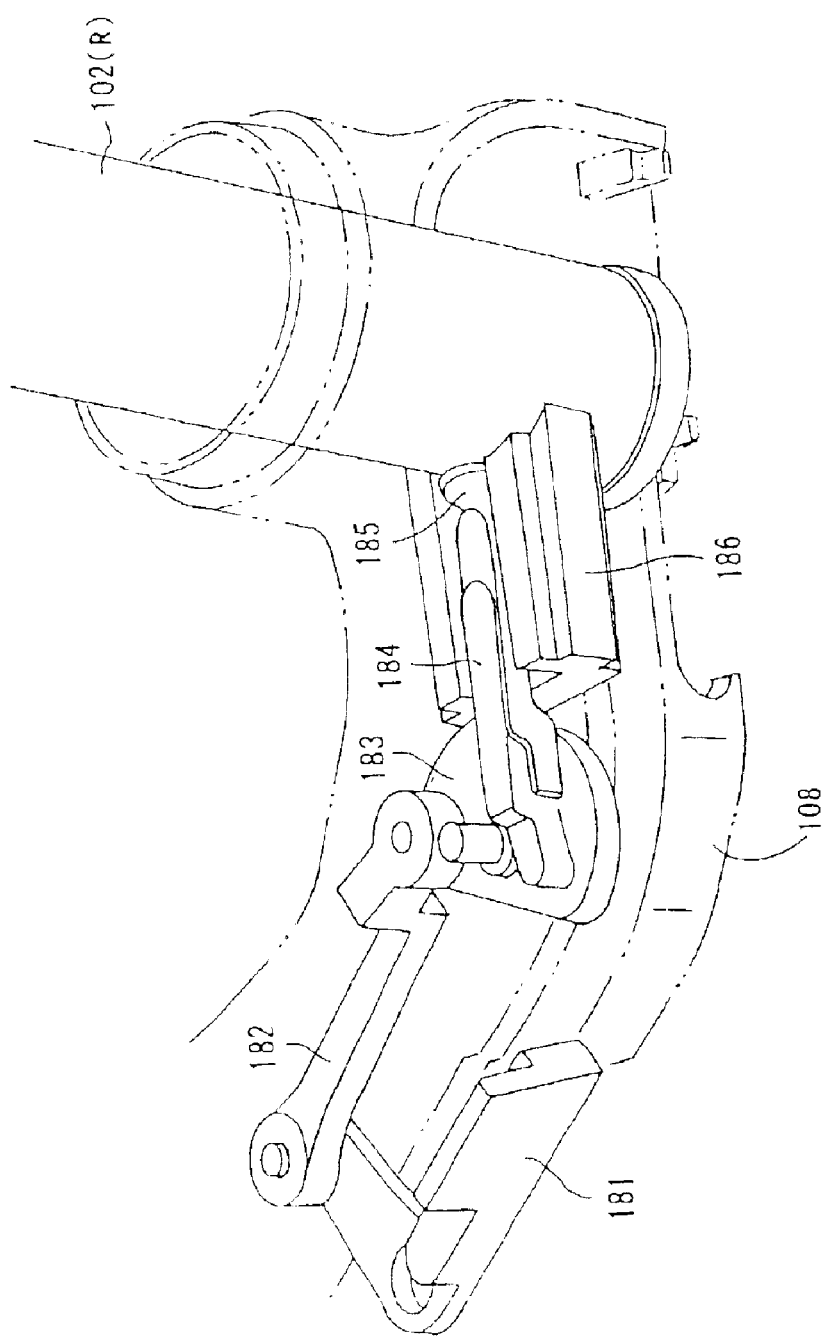
FIG. 28 is a partially broken perspective view of a handle lock mechanism.
Figure 29:
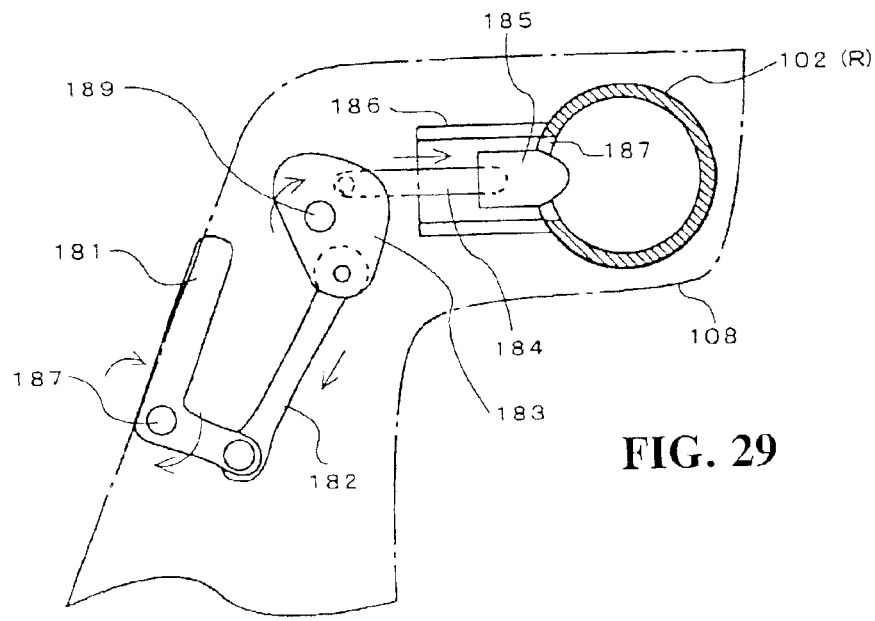
FIG. 29 is a view of the handle lock mechanism (locking) as viewed from the rear side of a handle bridge.
Figure 30:
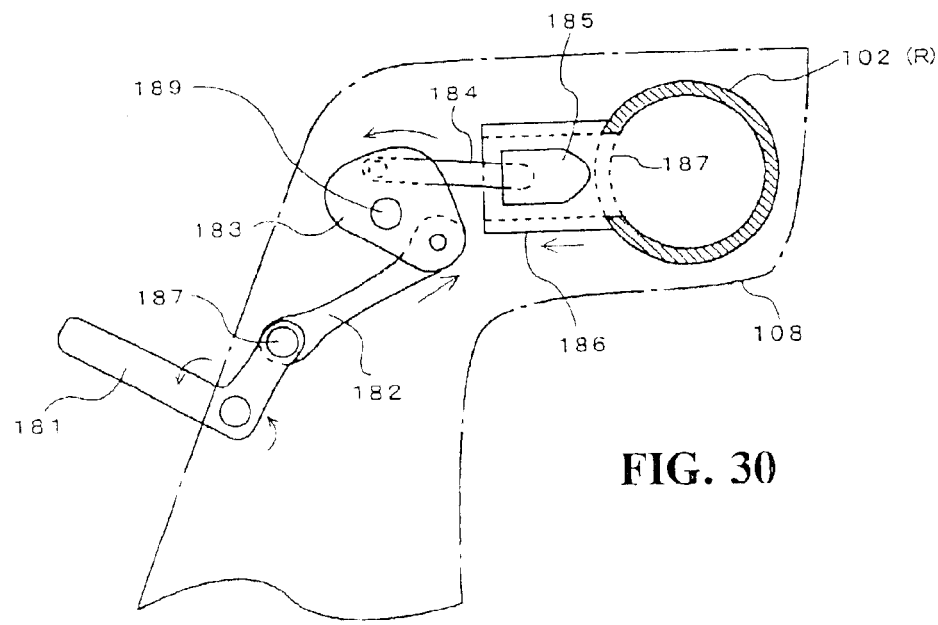
FIG. 30 is a view of the handle lock mechanism (unlocking) as viewed from the rear side of the handle bridge.

Now, a lock mechanism for each of the handle shafts 102 is described. FIG. 28 is a partial perspective view showing a lock mechanism between the handle shaft 102 and the handle bridge 108. FIGS. 29 and 30 are views showing the handle lock mechanism as viewed from the rear side of the handle bridge 108. While the handle lock mechanism is provided for both of the left and the right of the handle shafts 102, the description given here of the mechanism provided for the handle shaft 102(R) on the right side is only an example.

Figure 31:
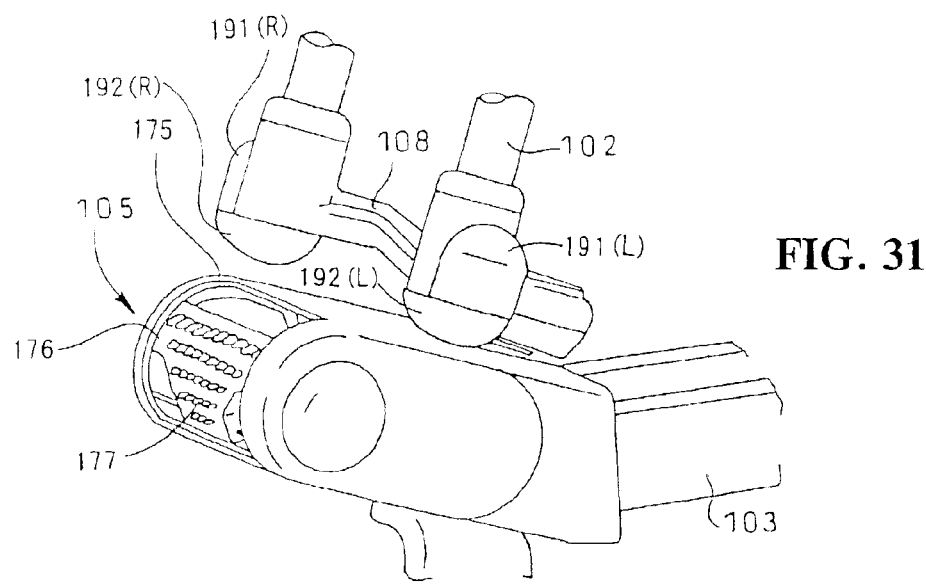
FIG. 31 is a view showing a handle shaft in an extended state.

The handle lock mechanism includes an L-shaped operation lever 181, a rod 182, an eccentric crank 183, another rod 184, a pusher 185, and a pusher guide 186. In the extension state shown in FIG. 31, since the L-shaped operation lever 181 is pushed in to the rear side of the handle bridge 108 as shown in FIG. 29, a tip of the pusher 185 enters an opening 187 provided at a side portion of the handle shaft 102 to stop the handle shaft 102 against sliding movement.

Figure 32:
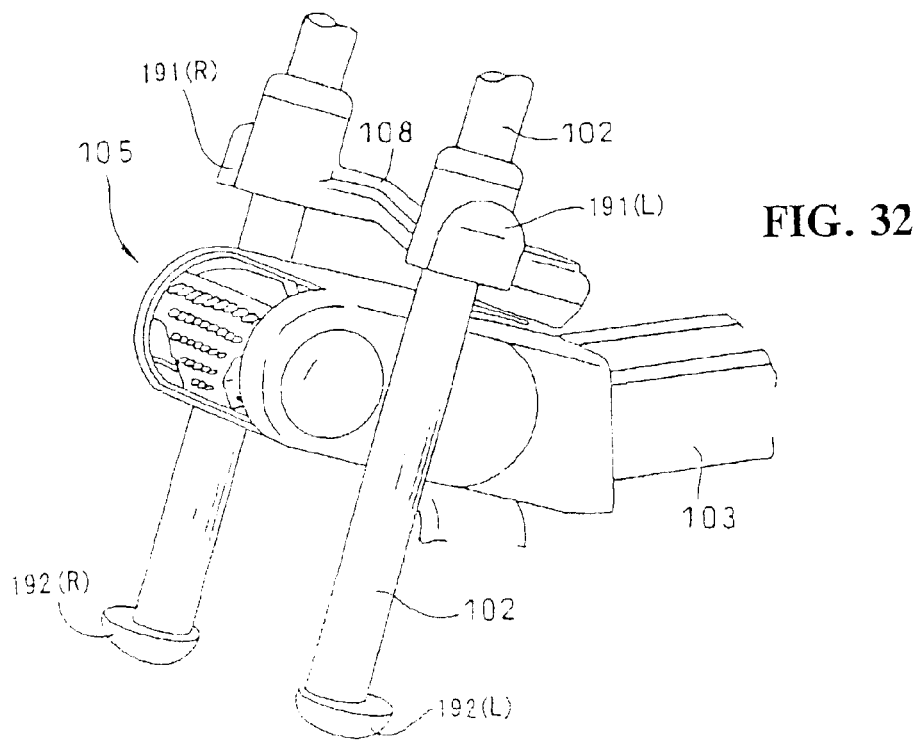
FIG. 32 is a view showing the handle shaft in an accommodation state.

On the other hand, in the contraction state, if the L-shaped operation lever 181 is pulled out, then the eccentric crank 183 is pivoted in the counterclockwise direction and the pusher 185 is pulled out through the rod 184, as shown in FIG. 30. Accordingly, if the left and right L-shaped operation levers 181 are operated to release the handle lock and the handle shafts 102 are pushed down in this state, then the handle shafts 102 slidably move downwardly with respect to the handle bridge 108, as shown in FIG. 32.

The connectors 191(R, L) and 192(R, L), similar to the connectors 161 and 162 for electrically connecting the front frame 1 and the center frame 3, are provided at the opposite side portions of the handle bridge 108 and the lower ends of the handle shafts 102(R, L). If fitting between the connectors 191(R, L) and the connectors 192(R, L) is cancelled, and they are spaced away from each other as a result of the sliding movement described above, then the handle bridge 108 and the handle shafts 102 are electrically disconnected from each other.

Figure 33:
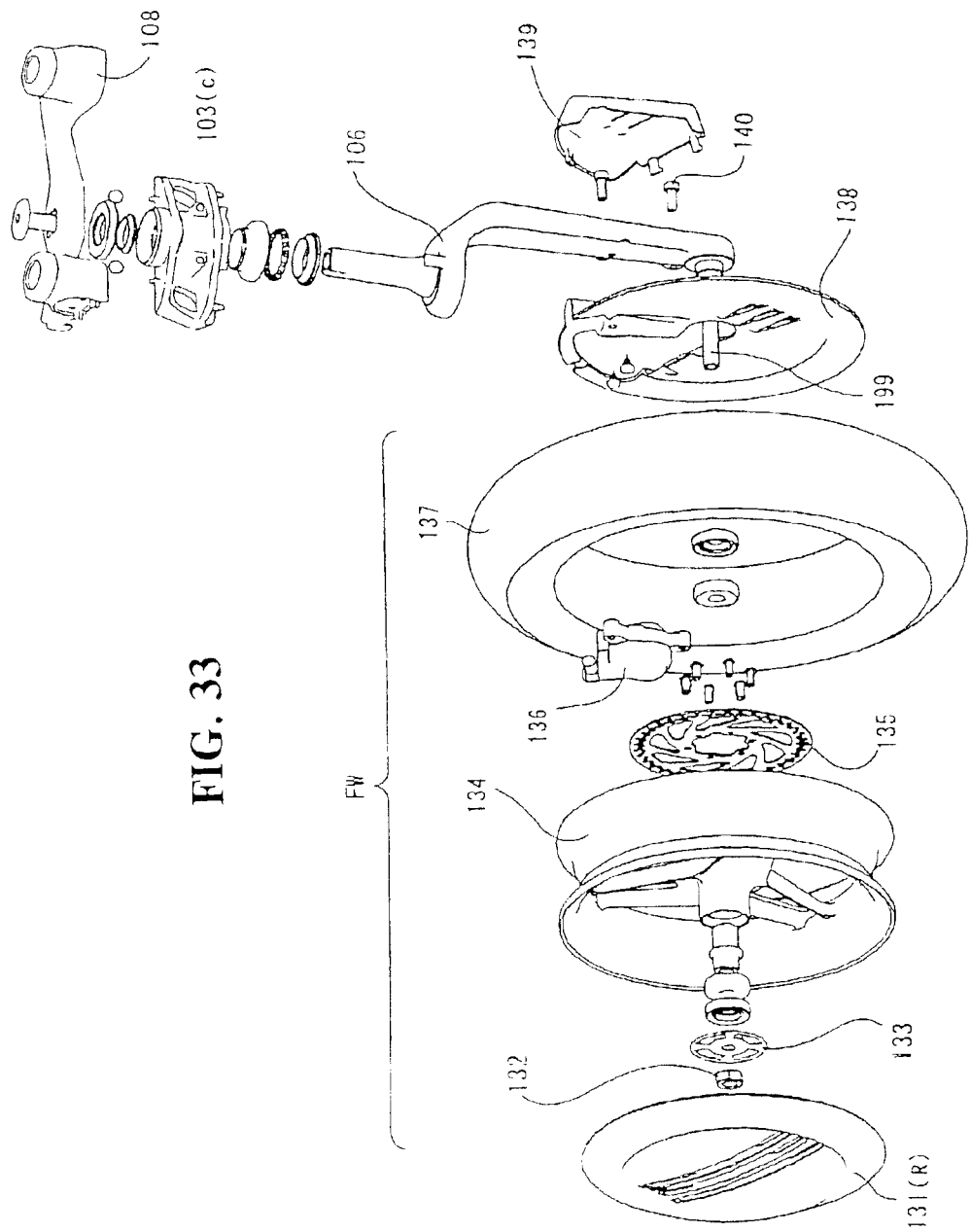
FIG. 33 is a view showing a configuration of a front wheel FW.

FIG. 33 is an exploded view showing a configuration of the front wheel FW. In FIG. 33, like reference characters to those appearing above denote like or corresponding elements.

The front wheel FW includes a mounting flange 133, a front wheel 134, a disk rotor 135, and a tire 137 as principal components thereof, and the disk rotor 135 is securely screwed to the front wheel 134. The front wheel FW is fitted on and supported in a cantilever-like manner on a front wheel axle 199 extending from an end of the front fork 106 together with left and right wheel caps 131 and 138 and is fastened by a nut 132. A brake caliper 136 is securely screwed to the front fork 106 together with a wheel cap 138. A caliper cover 139 is secured to the wheel cap 138 by screws 140.

Figure 34:
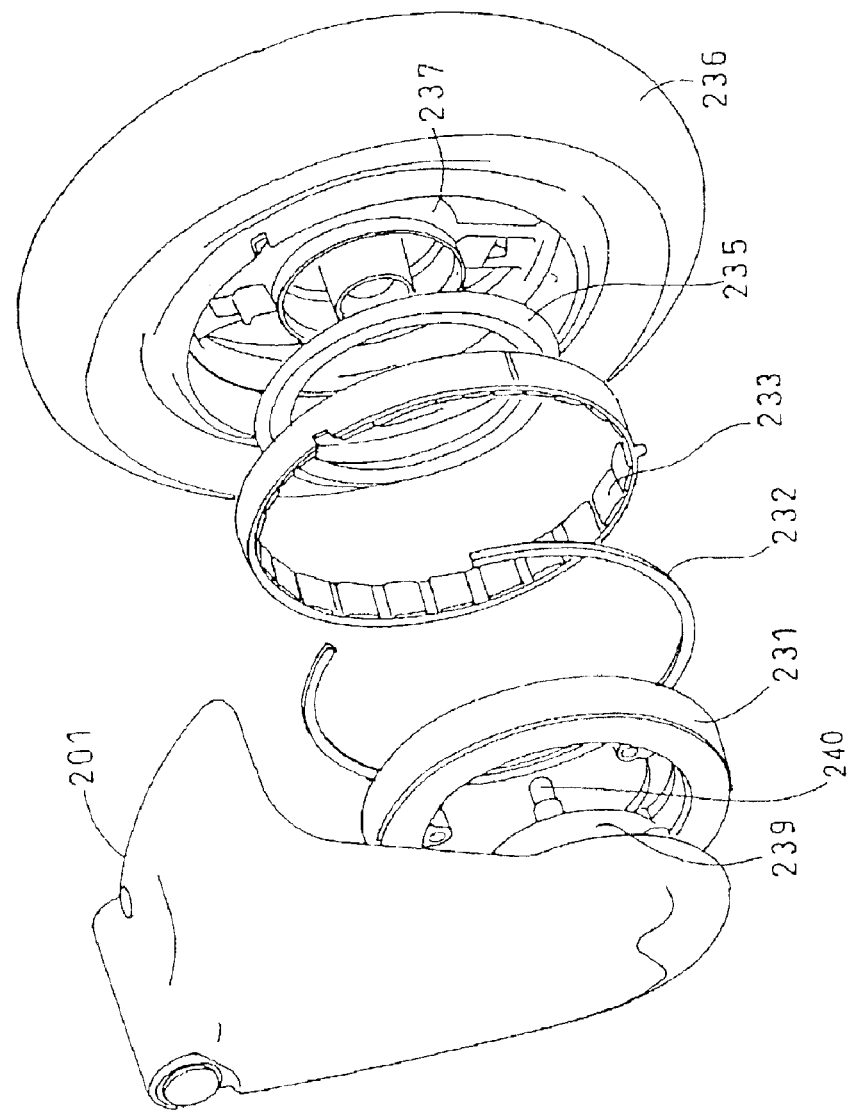
FIG. 34 is a view showing a configuration of a rear wheel RW.

FIG. 34 is an exploded view showing a configuration of the rear wheel RW. In FIG. 34, like reference characters to those appearing above denote like or corresponding elements.

The swing arm 201 includes a drum brake 239 and a rear wheel axle 240, and a stator 231 is securely screwed to an outer periphery of the drum brake 239. On the rear wheel 237 side, a sensor 235 and a magnet rotor 233 are fitted coaxially and secured by a clip 232.

Figure 35:
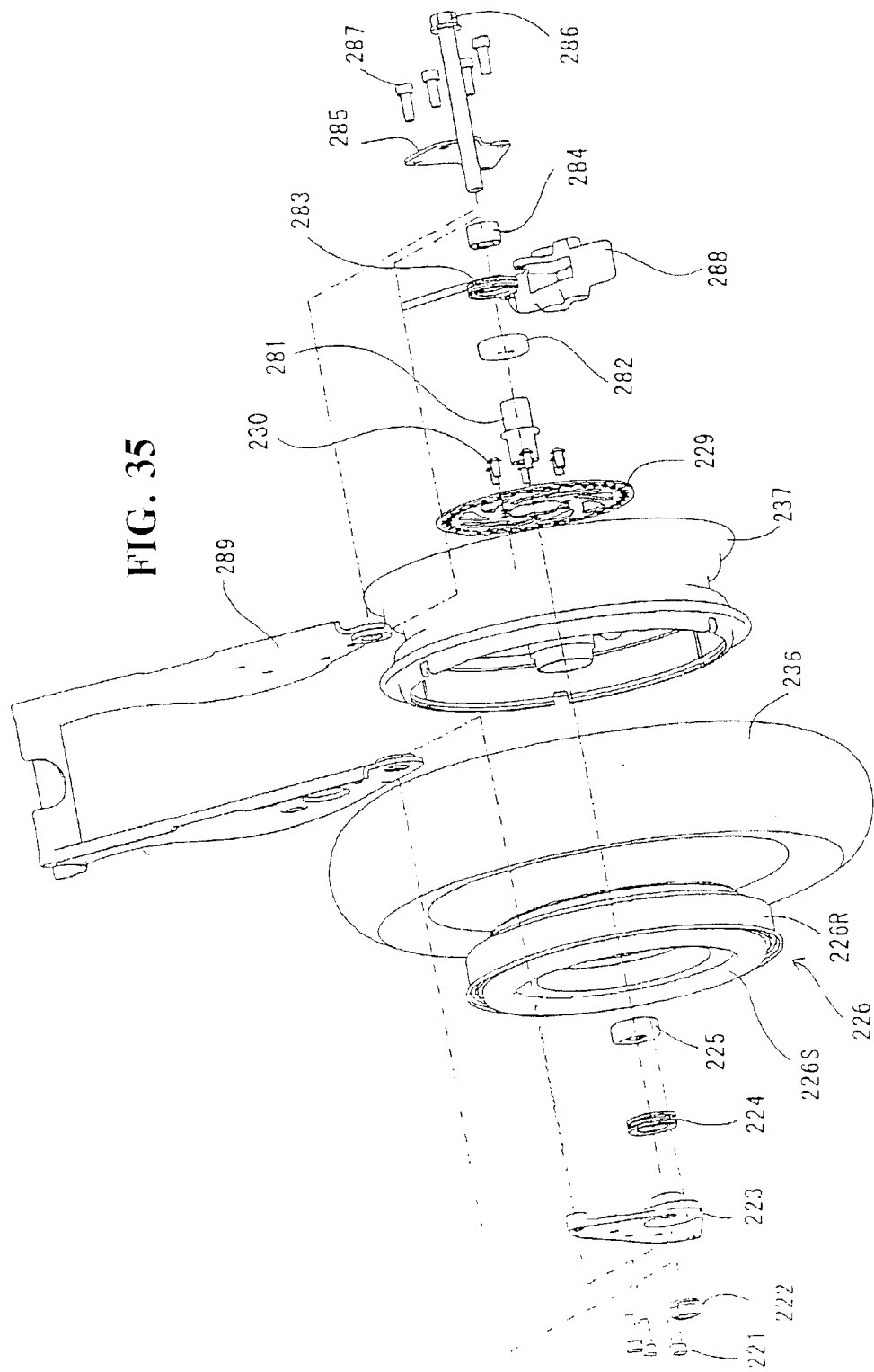
FIG. 35 is a view showing another configuration of the rear wheel RW.

FIG. 35 is an exploded view showing another configuration of the rear wheel RW. In FIG. 35, like reference characters to those appearing above denote like or corresponding elements.

The rear wheel RW includes a rear wheel tire 236, and the rear wheel 237 for the rear wheel tire 236, a drive motor 226 accommodated on the inner side of the rear wheel 237, a disk rotor 229, and a caliper 288 for the disk rotor 229 as principal components. The drive motor 226 includes a stator 226S and a magnet rotor 226R which rotates on the outer side of the stator.

The rear wheel 237 is supported on a rear wheel shaft 286 through a center shaft 281 and left and right bearings 252 and 282. Left and right dust seals 224 and 283, a collar 284, and a bracket 223 are fitted on the rear wheel shaft 286 and are securely fastened to a rear fork 289 by a nut 222.

Figure 36:
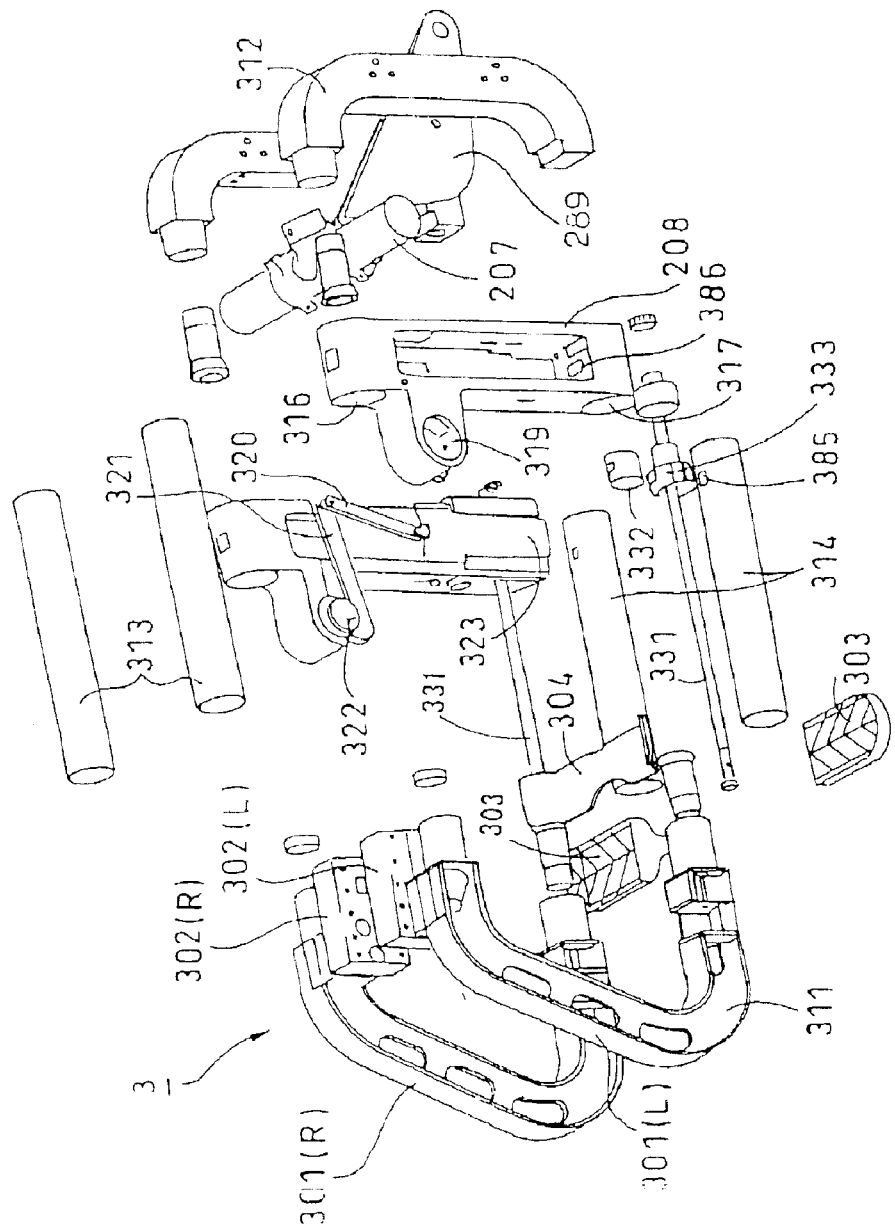
FIG. 36 is a view showing a method of supporting the rear wheel RW shown in FIG. 35.

The stator 226S of the drive motor 226 is secured to the rear fork 289 with the bracket 223 by screws 221. The disk rotor 229 is securely fastened to the right side of the rear wheel 237 by screws 230. The caliper 288 is securely fastened to the rear frame 2 through a caliper stay 285 by screws 287. The rear fork 289 is connected and secured at one end thereof to the swing shaft 207 as shown in FIG. 36. Accordingly, in the present embodiment, the rear fork 289 is secured to the vehicle body frame without being rocked relative to the latter.

Figure 37:
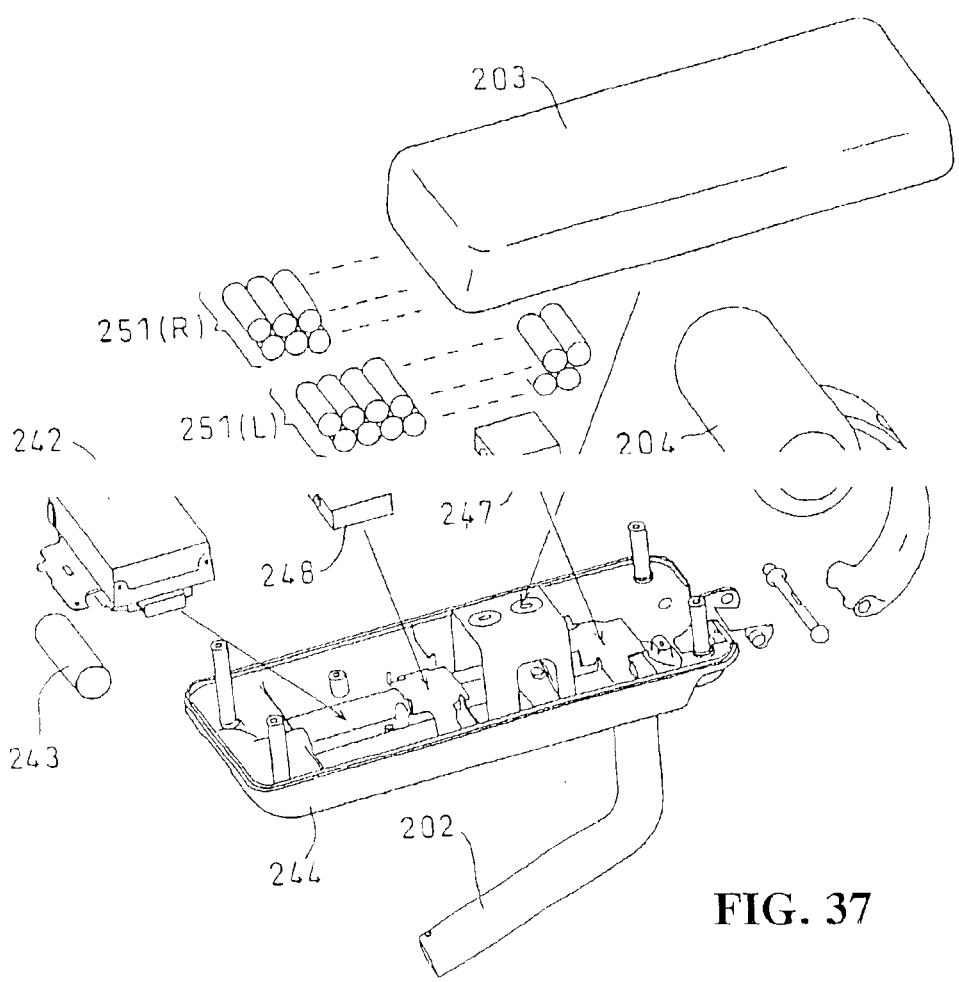
FIG. 37 is a view showing a configuration of a power supply accommodation section.

FIG. 37 is a view showing a configuration of a power supply accommodation section 244 assured below the seat 203. Two battery units 251(R, L) each including a plurality of unit cells juxtaposed like barrels and shrink-packed into a unitary block are accommodated in the power supply accommodation section 244 together with breaker switch 247 and 248, a control unit 242 including a DC-DC converter, and a high capacitance capacitor 243.

Figure 38:
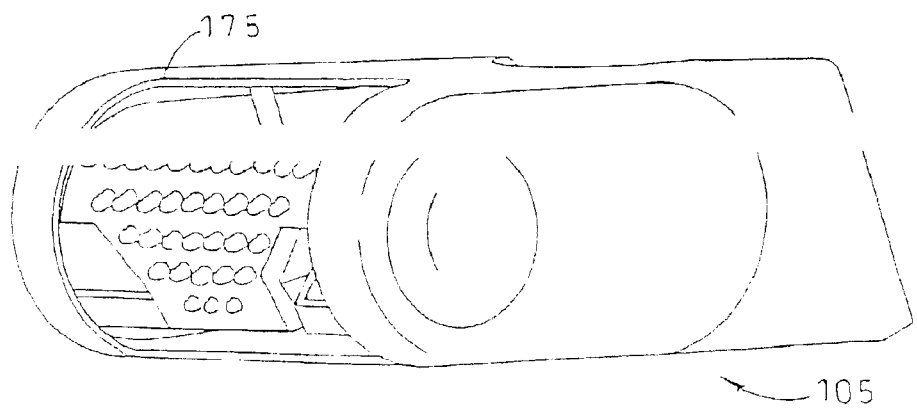
FIG. 38 is a perspective view of a headlamp unit.
Figure 39:
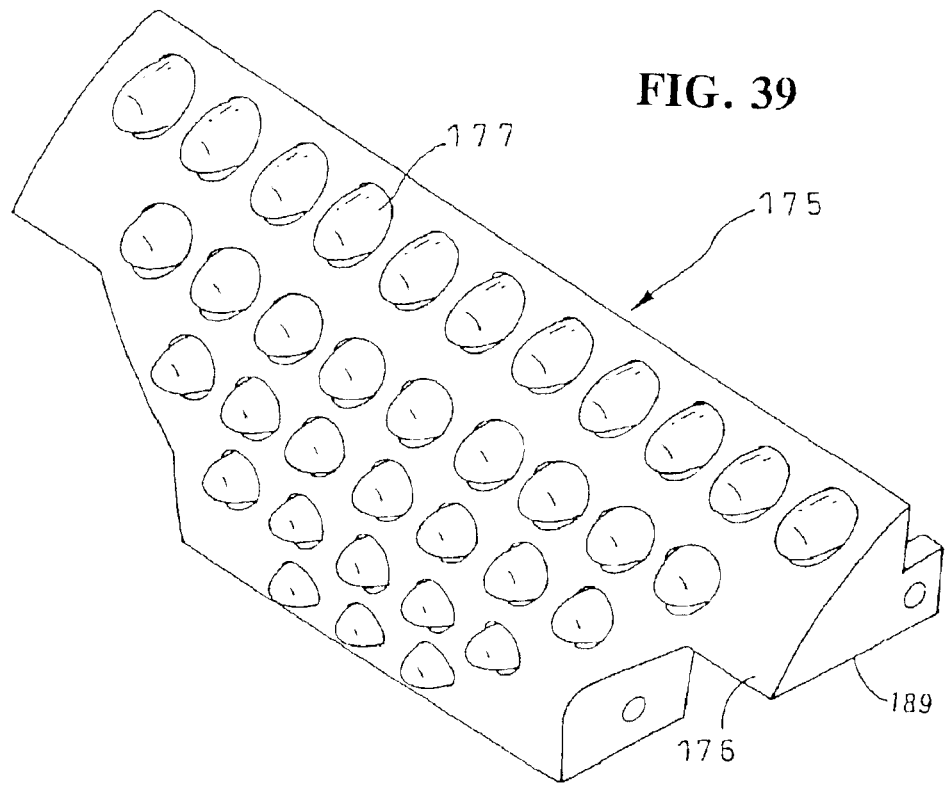
FIG. 39 is a perspective view of a headlamp light source section.
Figure 40:
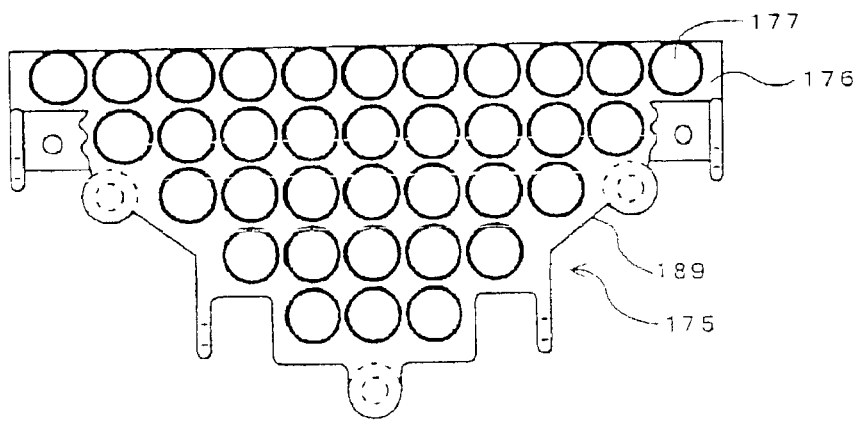
FIG. 40 is a front elevational view of the headlamp light source section.
Figure 41:
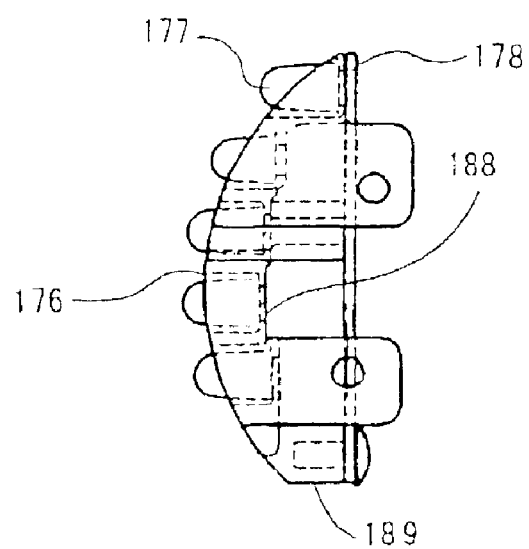
FIG. 41 is a side elevational view of the headlamp light source section.

FIG. 38 is a perspective view of the headlight unit 105, FIG. 39 is a perspective view of a light source section 175 built in the headlight unit 105, FIG. 40 is a front elevational view of the light source section 175, and FIG. 41 is a side elevational view of the light source section 175.

As shown in FIGS. 40 and 41, the light source section 175 in the present embodiment includes, a base member 189, a base plate 178 mounted on the base member 189, and a plurality of LEDs 177 held three-dimensionally by the base member 189.

The base member 189 has a curved base face 176 in which a large number of openings are provided in the directions of rows and columns, and a stepped abutting face 188 is formed on the bottom of each of the openings. Each of the white LEDs 177 of high luminance is accommodated in one of the openings such that it is partly exposed forwardly by a predetermined distance from the base face 176. Each of the LEDs 177 is securely soldered at electrode pins thereof to the base plate 178 in a pushed-in state such that the rear face thereof is abutted with the abutting face 188. Accordingly, the length of the exposed portion of each of the LEDs 177 is defined by the step of the abutting face 188. A drive circuit for driving the LEDs 177 to be lit is carried on the base plate 178.

In this manner, LEDs can be disposed three dimensionally without using a curved base plate. Further, since the heights or the directions of the LEDs do not rely upon soldering between the base plate 178 and the LED electrodes, the LEDs can be disposed three-dimensionally with a high degree of light distribution accuracy and without individual differences.

Figure 42:
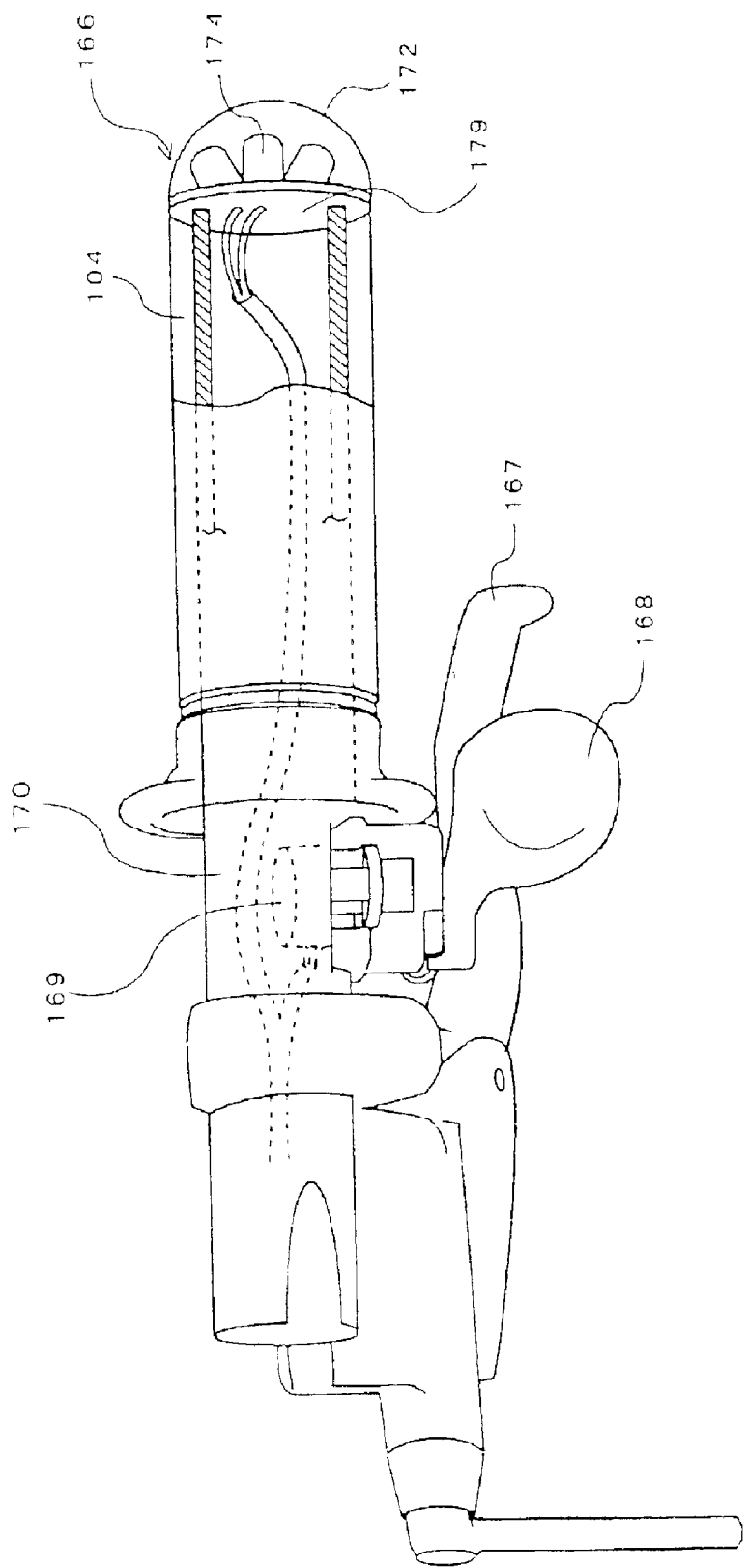
FIG. 42 is a partially broken view showing a configuration of a handle grip and associated elements.

FIG. 42 is a view partly broken showing a configuration of the right side handle grip and associated elements. A winker unit 166 (described later) is mounted on a handle pipe 170, and the grip 104 is mounted on an outer periphery of the winker unit 166. A brake lever 167 and an accelerator lever 168 are provided at an inner side end portion of the grip 104, that is, within a range within which, when the grip is gripped with the right hand, the thumb of the right hand reaches. The opening of the accelerator lever 168 is detected by an accelerator opening sensor 169.

Figure 43:
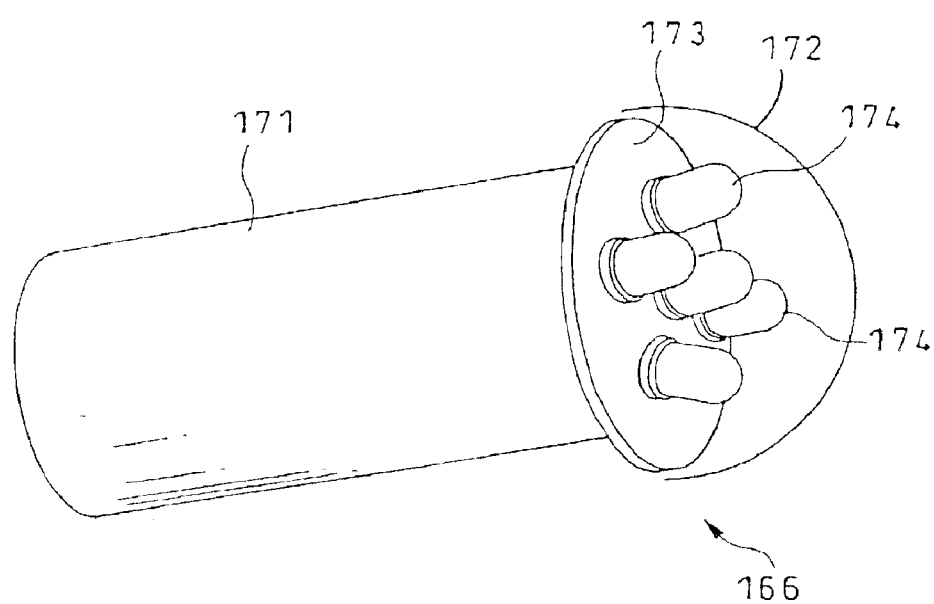
FIG. 43 is a perspective view of a winker unit.
Figure 44A:
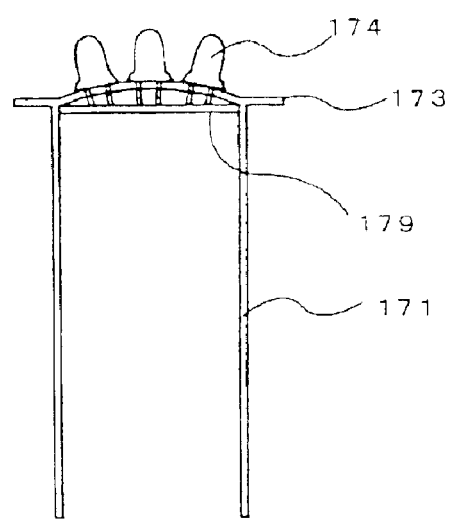
FIGS. 44(a) and (b) are sectional views of the winker unit.
Figure 44B:
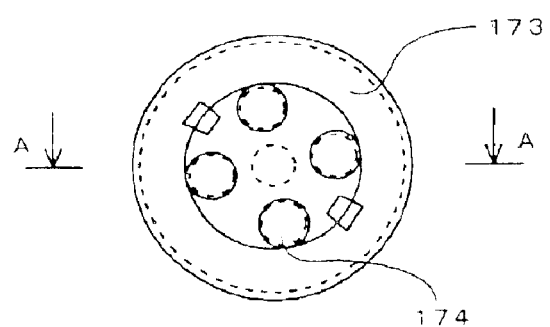

FIG. 43 is a perspective view of the winker unit 166. FIG. 44(a) is a sectional view and FIG. 44(b) is an end portion front elevational view of the winker unit 166.

The winker unit 166 in the present embodiment includes, as shown in FIG. 44, a support pipe 171 fitted in the handle pipe 170, a base plate 179, a circular supporting portion 173 provided at an end of the support pipe 171 and swollen spherically at a central portion thereof, and five LEDs 174. The end portion of the support pipe 171 at which the LEDs 174 are exposed are covered with a transparent cap 172, as shown in FIG. 43.

The five LEDs 174 are secured to the base plate 179 such that four LEDs are disposed in a spaced relationship by 90 from each other around the remaining one LED which is positioned as the center thereof. The optical axis of this remaining LED is displaced a little outwardly from the center axis. Adjustment of the optical axis of each of the LEDs 174 is performed such that the LED 174 is inserted until the bottom thereof is abutted with the spherical face of the circular supporting portion 173 and electrodes thereof are fixed to the base plate 179.

With the configuration just described, the light distribution characteristic of the winker can be defined accurately by the shape of the circular supporting portion 173. Further, since the winker can be formed in a small size at an end portion of the handle, the operability of the handle is not damaged by the winker at all.

Figure 45:
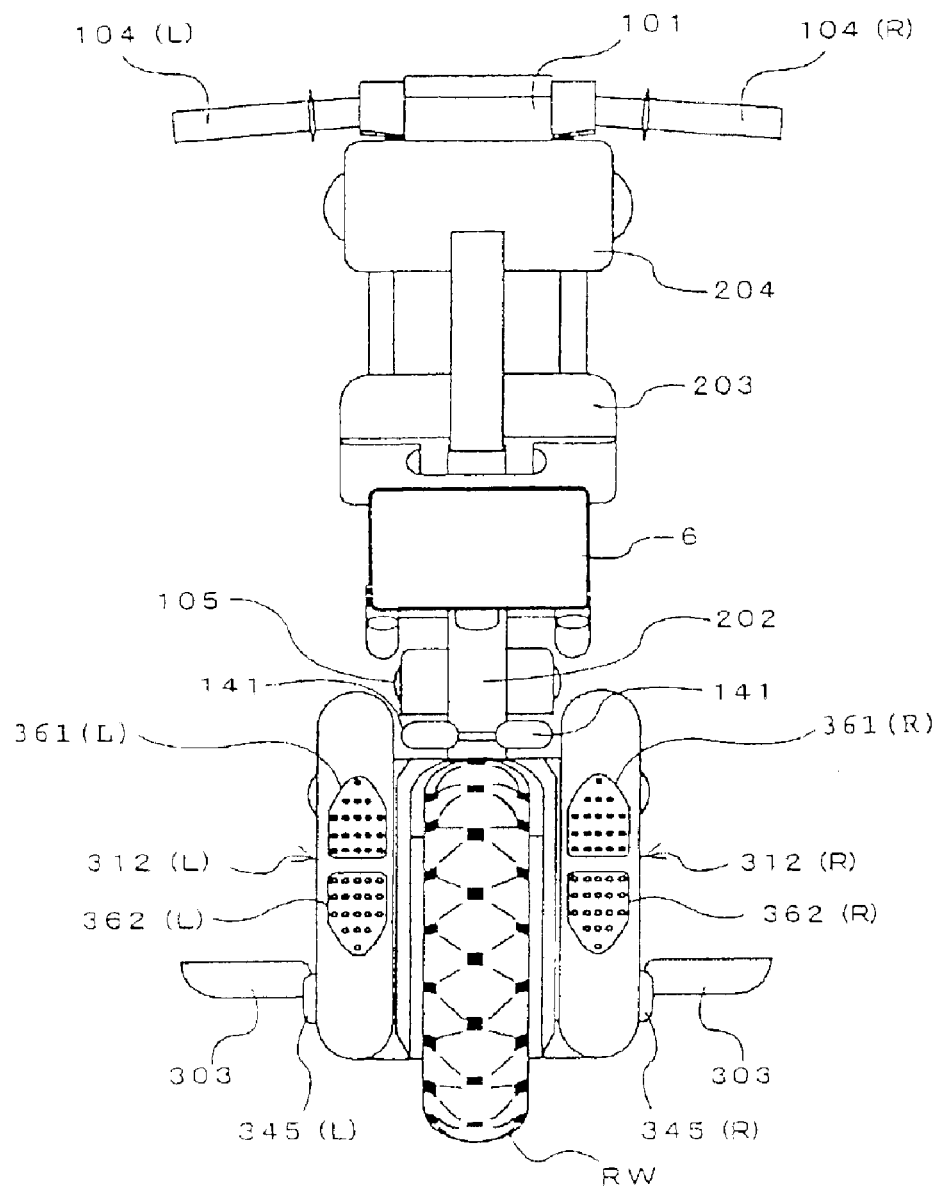
FIG. 45 is a rear elevational view of the motor-driven two-wheeled vehicle.

FIG. 45 is a rear elevational view of the motor-driven two-wheeled vehicle. In FIG. 45, like reference characters to those appearing above denote like or corresponding elements.

In the present embodiment, a large number of red LEDs are disposed three-dimensionally at rear portions of frame bodies 312(R, L) to form brake lamps 361(R, L). Orange LEDs are disposed three-dimensionally on the lower side of the brake lamps 361(R, L) to form winker lamps 362(R, L). A number plate 6 is disposed rearwardly of the seat 203.

In this manner, in the present embodiment, since LEDs are adopted as light sources for the headlight, brake lamps, and winkers, power saving essential to an electrically operated vehicle can be achieved. Further, since LEDs are adopted for a light source, restrictions in design are moderated, and consequently, augmentation in appearance can be achieved.

Subsequently, communication functions incorporated in two-wheeled vehicles and a four-wheeled vehicle are described. In the present embodiment, each of two-wheeled vehicles and a four-wheeled vehicle has a receiving slot for a card key in which transmission and reception functions are built together with an identification code (ID). The card keys removably loaded in such card key receiving slots in the two vehicles can communicate with each other by radio.

Figure 48:
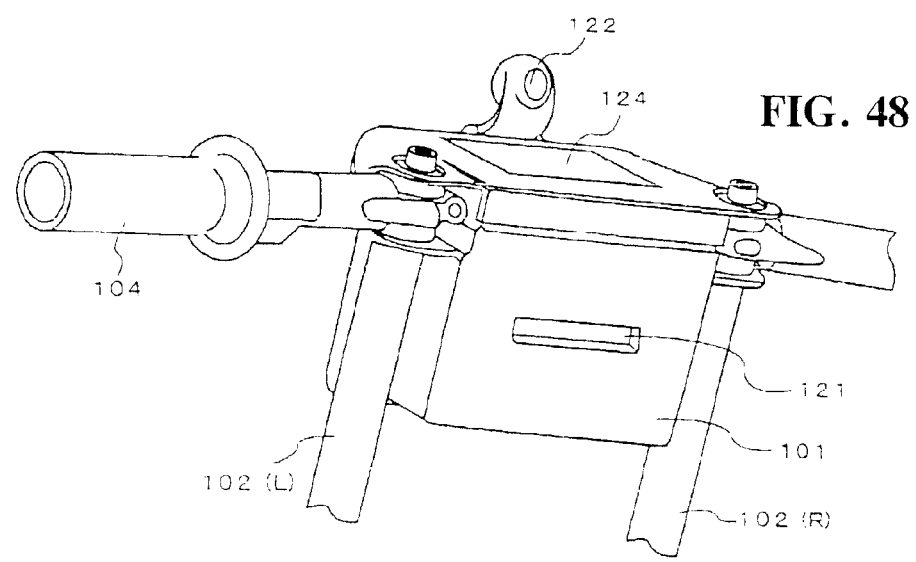
FIG. 48 is a view of a meter unit of the motor-driven two-wheeled vehicle as viewed from obliquely rearwardly.

FIG. 48 is a view of the meter unit 101 of the above-described two-wheeled vehicle as viewed from obliquely rearwardly. A card key receiving slot 121 is provided on a side face of the meter unit 101 which opposes to the driver. A CCD camera 122 is provided at an upper portion of a front face of the meter unit 101, and an LCD display unit 124 is provided at an upper face of the meter unit 101.

The CCD camera 122 is supported for pivotal motion in the forward and backward directions by a rotatable shaft not shown. In a pivoted position of the CCD camera 122 shown in FIG. 48, the CCD camera 122 is directed to the position of the face of the driver, but when the CCD camera 122 is pivoted forwardly, it is directed to the front in the advancing direction. Accordingly, by changing the pivotal position of the CCD camera 122, the expression of the driver and the view in the advancing direction can be selectively picked up as an image.

Figure 49:
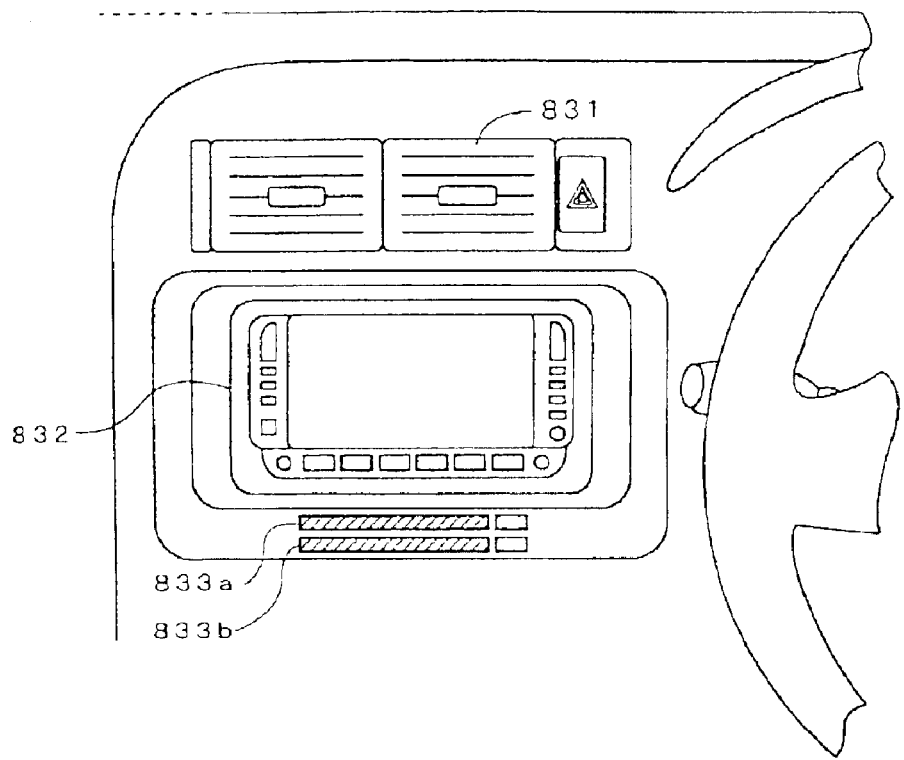
FIG. 49 is a front elevational view of an instrument panel of a four-wheeled vehicle.

FIG. 49 is a front elevational view of a central portion of an instrument panel of the vehicle 8 and associated elements around the same. A car navigation system 832 is mounted below a blowing hole 831. Two card key receiving slots 833a and 833b are provided below the car navigation system 832.

Figure 50:
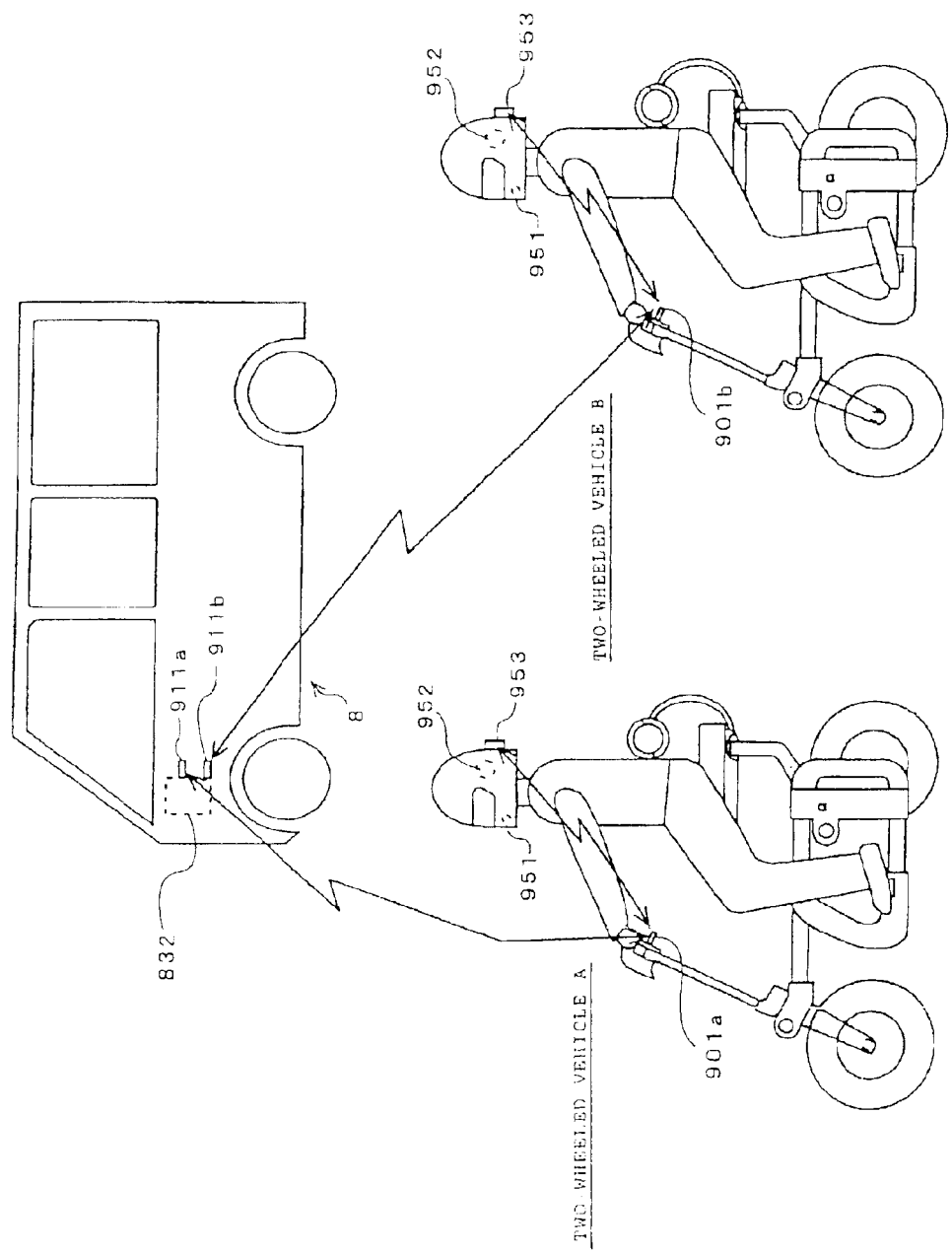
FIG. 50 is a view showing an example of a communication form through a card key.

FIG. 50 is a view schematically showing an example of a form of communication through card keys loaded in the card key receiving slots 121, 833a, and 833b.

The card key 901a loaded on a two-wheeled vehicle A communicates with the card key 911a loaded in the card key receiving slot 833a of the vehicle 8. Further, in the present embodiment, a microphone 951, a speaker 952, and a transmitter-receiver 953 are provided on each of helmets of drivers, and the card key 911a communicates also with the transmitter-receiver 953.

The card key 901b loaded in another two-wheeled vehicle B communicates with the card key 911b loaded in the card key receiving slot 833b of the vehicle 8 and the transmitter-receiver 953 of the helmet. In the present embodiment, since two card keys can be loaded on the vehicle 8, the vehicle 8 can communicate in parallel with both of the two-wheeled vehicles A and B.

Figure 51:
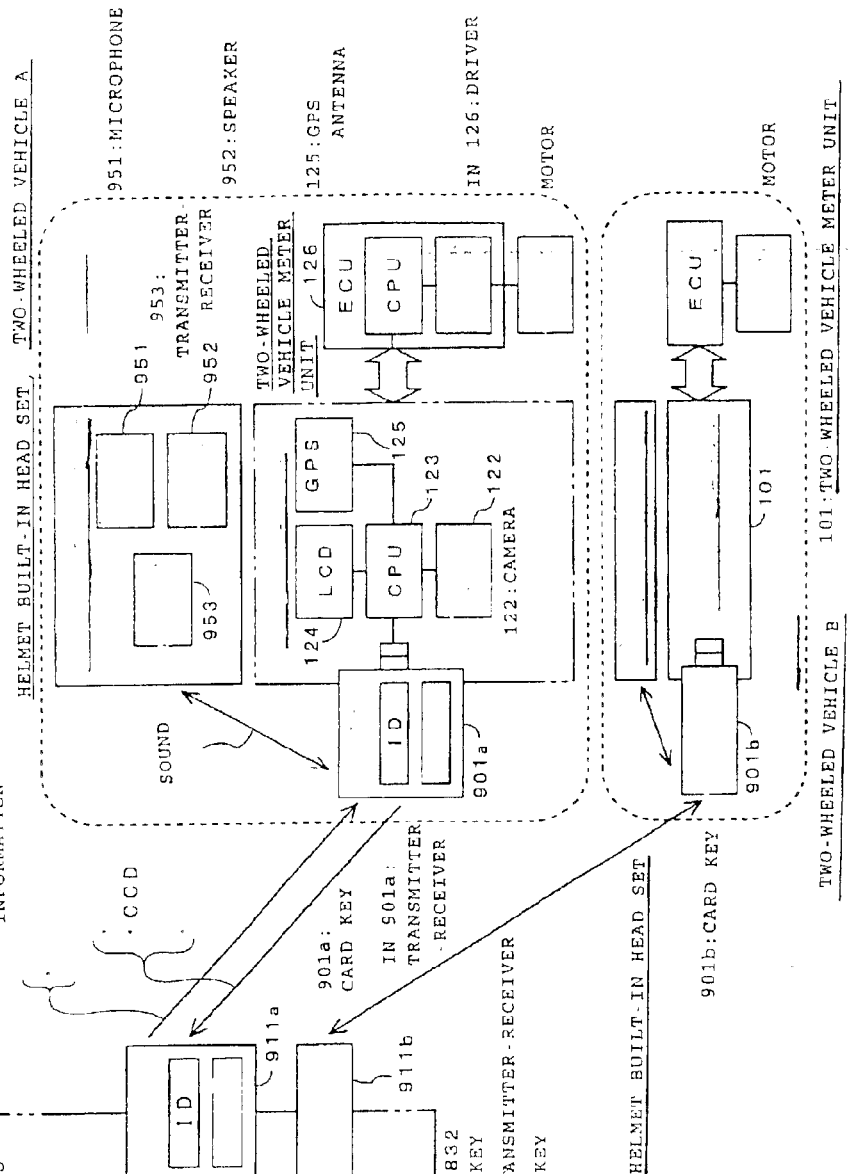
FIG. 51 is a block diagram of a vehicle communication system which uses a card key.

FIG. 51 is a block diagram showing a configuration of the vehicle communication system described above. In FIG. 51, like reference characters to those appearing above denote like or corresponding elements.

The car navigation system 832 incorporated in the four-wheeled vehicle includes a CPU 865, a GPS antenna 861, a CD-ROM (or DVD-ROM) 862 in which map software is stored, a CCD camera 863 directed to the position of the face of the driver, and an LCD display unit 864. Each of the card keys 911a and 911b loaded in the two card key receiving slots includes an ID unique to itself and a transmitter-receiver.

Each of the meter units 101 of the two-wheeled vehicles A and B includes a CPU 123, a GPS antenna 125, a CCD camera 122, and an LCD display unit 124. Each of the card keys 901a and 901b loaded in the card key receiving slots includes an ID unique to itself and a transmitter-receiver.

In such a configuration as described above, if the card key 901a is loaded into one of the card key receiving slots of the two-wheeled vehicle A, the ID registered in the card key is read and collated for discrimination. If it is confirmed that the card key 901a is a regular card key, then an enabling signal is transmitted from the meter unit 101 to an ECU 126, and driving of the motor and feeding to the electric parts are enabled. If the card key 901a is not a regular card key, then an inhibition signal is transmitted from the meter unit 101 to the ECU 126, and driving of the motor and operation to the electric components of the two-wheeled vehicle are inhibited.

After the enabling signal is transmitted, if GPS radio waves transmitted from a plurality of GPS satellites are detected by the GPS antenna 125 of the two-wheeled vehicle A, then the CPU 123 recognizes the longitude and the latitude of the vehicle itself based on the received radio waves and transmits them as navigation information to the car navigation system 832 of the four-wheeled vehicle through the card key 901a of the vehicle itself. In the car navigation system 832, the CPU 865 produces peripheral map information of the two-wheeled vehicle A based on the map software stored in the CD-ROM 862 and the received navigation information, and transmits the produced peripheral map information to the two-wheeled vehicle A through the card key 911a. On the two-wheeled vehicle A, the map information received by the card key 901a is displayed on the LCD display unit 124.

In this manner, since the car navigation apparatus incorporated in the four-wheeled vehicle can be utilized on the two-wheeled vehicles, the configuration of the two-wheeled vehicles can be simplified, and any increase in weight and cost can be minimized.

On the other hand, video data of the driver or the view picked up as an image by the CCD camera 122 of the two-wheeled vehicle A is encoded and compressed by the CPU 123 and then transmitted to the car navigation system 832 by the transmitter-receiver of the card key 901a. In the car navigation system 832, the CPU 865 decodes the video data, and the video data is displayed on the LCD display unit 864. Similarly, video data of the driver picked up as an image by the CCD camera 863 of the four-wheeled vehicle is encoded and compressed by the CPU 865 and then transmitted to the two-wheeled vehicle A by the transmitter-receiver of the card key 911a. In the meter unit 101 of the two-wheeled vehicle A, the CPU 123 decodes the video data, and the video data is displayed on the LCD display unit 124. In this manner, since a video image can be exchanged between the two-wheeled vehicles and the four-wheeled vehicle, comfortable communication can be achieved.

Further, in the present embodiment, the transmitter-receiver 953 is provided on the helmet to be worn by the driver of each of the two-wheeled vehicles, and an audio signal detected by the microphone 951 is transmitted from the transmitter-receiver 953 and transmitted to the four-wheeled vehicle through the card key 901a (901b) of the two-wheeled vehicle.

It is to be noted that, also when the two-wheeled vehicle B and the driver of the two-wheeled vehicle B communicate with the four-wheeled vehicle, the communication is performed in a similar manner to that described above except that the card key 901b of the two-wheeled vehicle B and the card key 911b of the four-wheeled vehicle communicate with each other. Therefore, description of the communication is omitted.

Further, in the present embodiment, an audio signal transmitted from a helmet and received by the card key 901a (901b) of a two-wheeled vehicle is fetched also into the meter unit 101. The CPU LCD 123 recognizes the audio signal by speech recognition to discriminate an instruction of the driver and changes a display mode or a display item of the LCD display unit 124.

With the present embodiment, since a video image picked up by a CCD camera incorporated in a two-wheeled vehicle can be enjoyed on the four-wheeled vehicle (or vice versa), each of the driver of the two-wheeled vehicle and a passenger of the four-wheeled vehicle can confirm the expression of the other party. Further, since a microphone, a speaker and a transmitter-receiver are incorporated in a helmet to be worn by each driver and the transmitter-receiver can communicate with the other card key of any other vehicle through the card key of the vehicle itself, the drivers of the vehicles can communicate with each other while observing the face of the other party on the display unit.

It is to be noted that, while, in the embodiment described above, the car navigation apparatus incorporated in the four-wheeled vehicle can also be utilized from a two-wheeled vehicle, an acoustic apparatus such as a car audio system or a radio unit incorporated in the four-wheeled vehicle can be utilized from a two-wheeled vehicle through a similar procedure.

According to the present invention, the following effects are achieved.

(1) Since a card key in which transmission and reception functions are built is loaded into each of vehicles to allow communication between the vehicles, a function which is incorporated in only one of the vehicles can be utilized also from the other vehicle by remote control.

(2) Since identification information is registered in the card key and is utilized to manage the power supply of a two-wheeled vehicle, a theft prevention function and transmission and reception functions can be provided on the single card.

(3) Since a plurality of card keys can be loaded on one vehicle, the vehicle can communicate in parallel with a plurality of other vehicles.

(4) Apparatus, such as car navigation apparatus or an acoustic apparatus, tends to be expensive and large in volume, and therefore is incorporated in the four-wheeled vehicle. Since it can be utilized by remote control from the two-wheeled vehicles, the configuration of the two-wheeled vehicles can be simplified, and the increase in weight and the economical burden on the two-wheeled vehicles can be minimized.

(5) Where a video image picked up by the CCD camera incorporated in any of the two-wheeled vehicles can be enjoyed on the four-wheeled vehicle, each of the drivers of the two-wheeled vehicle and the passenger of the four-wheeled vehicle can confirm the expression of the other party.

(6) Since head set and transmission and reception functions are incorporated in a helmet such that the transmission and reception functions can communicate with a card key of another vehicle through a card key, the passengers of the vehicles can communicate with each other.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle comprising:
   a first card key on said vehicle, which permits or inhibits use of a second vehicle having a second card key, said first card key having a transmission and reception function built therein for communicating by radio with said second card key on said second vehicle;
   a card key loading section on said vehicle into which said first card key is loaded;
   control means for controlling the transmission and reception functions of the first card key, said control means making use of the transmission and reception functions of the first card key to communicate with the second vehicle having the second card key loaded thereon,
   wherein the use of the second vehicle is based on a result of collation of an ID built into said second card key.

2. The vehicle according to claim 1, further comprising a plurality of card key loading sections on said vehicle, each loading section being capable of holding one of a plurality of card keys, the plurality of card keys enabling said vehicle to communicate in parallel with a plurality of other vehicles.

3. A vehicle according to claim 2, wherein said vehicle is a four-wheeled vehicle, and each of the plurality of other vehicles is a two-wheeled vehicle.

4. A radio communication system for a vehicle which utilizes a card key, comprising:
   a first of a plurality of card keys having transmission and reception functions being removably loaded onto a first of a plurality of vehicles; and
   others of the plurality of card keys being loaded on others of the plurality of vehicles other than the first vehicle, wherein the first vehicle is capable of transmitting and receiving data to and from said others of the plurality of vehicles on which the others of the plurality of card keys are loaded.

5. The radio communication system for a vehicle which utilizes a card key according to claim 4, wherein:
   said first of said plurality of vehicles incorporates a car navigation apparatus and transmits navigation data obtained by said car navigation apparatus from the first card key loaded thereon, and
   each of the others of the plurality of vehicles includes a display apparatus, and receives the navigation data by means of the card key loaded thereon and visibly displays the navigation data on said display apparatus.

6. The radio communication system for a vehicle which utilizes a card key according to claim 4, wherein:
   said first of said plurality of vehicles incorporates an image pickup apparatus and transmits video data obtained by said image pickup apparatus from the first card key loaded thereon, and
   each of the others of the plurality of vehicles includes a display apparatus, and receives the video data by means of the card key loaded thereon and visibly displays the video data on said display apparatus.

7. The radio communication system for a vehicle which utilizes a card key according to claim 4, wherein:
   said first of said plurality of vehicles incorporates an acoustic apparatus and transmits acoustic data outputted from said acoustic apparatus from the first card key loaded thereon, and
   each of the others of the plurality of vehicles includes a speaker system, and receives the acoustic data by means of the card key loaded thereon and outputs the acoustic data from said speaker system.

8. The radio communications system for a vehicle which utilizes a card key according to claim 4, further comprising a helmet including transmission and reception functions capable of communicating with at least one of said card keys, a microphone, and a speaker.

9. The radio communications system for a vehicle which utilizes a card key according to claim 4, wherein at least the first of said plurality of vehicles allows a plurality of card keys to be loaded thereon simultaneously and can communicate in parallel with the others of said plurality of vehicles.

10. A radio communication system for a vehicle which utilizes a card key, comprising:
    a first of a plurality of card keys having transmission and reception functions being removably loaded onto a first of a plurality of vehicles; and
    others of the plurality of card keys having unique IDs and being loaded on others of the plurality of vehicles for transmitting and receiving data to and from said first vehicle on which the first card key is loaded,
    wherein use of any of the others of the plurality of vehicles is permitted or inhibited based on collation of said unique IDs of each of the other vehicles and said first vehicle.

11. The radio communication system for a vehicle which utilizes a card key according to claim 10, wherein:
    said first of said plurality of vehicles incorporates a car navigation apparatus and transmits navigation data obtained by said car navigation apparatus from the first card key loaded thereon, and
    each of the others of the plurality of vehicles includes a display apparatus, and receives the navigation data by means of the card key loaded thereon and visibly displays the navigation data on said display apparatus.

12. The radio communication system for a vehicle which utilizes a card key according to claim 10, wherein:
said first of said plurality of vehicles incorporates an image pickup apparatus and transmits video data obtained by said image pickup apparatus from the first card key loaded thereon, and
each of the others of the plurality of vehicles includes a display apparatus, and receives the video data by means of the card key loaded thereon and visibly displays the video data on said display apparatus.

13. The radio communication system for a vehicle which utilizes a card key according to claim 10, wherein:
said first of said plurality of vehicles incorporates an acoustic apparatus and transmits acoustic data outputted from said acoustic apparatus from the first card key loaded thereon, and
each of the others of the plurality of vehicles includes a speaker system, and receives the acoustic data by means of the card key loaded thereon and outputs the acoustic data from said speaker system.

14. The radio communications system for a vehicle which utilizes a card key according to claim 10, further comprising a helmet including transmission and reception functions capable of communicating with at least one of said card keys, a microphone, and a speaker.

15. The radio communications system for a vehicle which utilizes a card key according to claim 10, wherein at least the first of said plurality of vehicles allows a plurality of card keys to be loaded thereon simultaneously and can communicate in parallel with the others of said plurality of vehicles.

* * * * *